(12) United States Patent
Ogink et al.

(10) Patent No.: US 11,129,492 B2
(45) Date of Patent: Sep. 28, 2021

(54) SYSTEM FOR PREPARING A BEVERAGE

(71) Applicant: KONINKLIJKE DOUWE EGBERTS B.V., Utrecht (NL)

(72) Inventors: Judith Margreet Hanneke Ogink, Putten (NL); Marjan Cornelissen, Drachten (NL); Peter Rijskamp, Gaggio Montano (IT); Klaas Kooijker, Drachten (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 177 days.

(21) Appl. No.: 16/261,826

(22) Filed: Jan. 30, 2019

(65) Prior Publication Data

US 2020/0000271 A1 Jan. 2, 2020

Related U.S. Application Data

(63) Continuation of application No. PCT/NL2017/050516, filed on Aug. 3, 2017.

(30) Foreign Application Priority Data

Aug. 3, 2016 (NL) .................................... 2017281

(51) Int. Cl.
*A47J 31/36* (2006.01)
*A47J 31/40* (2006.01)
(Continued)

(52) U.S. Cl.
CPC ......... *A47J 31/407* (2013.01); *A47J 31/0647* (2013.01); *A47J 31/3633* (2013.01);
(Continued)

(58) Field of Classification Search
CPC ................ A47J 31/3628; A47J 31/3623; A47J 31/3633; A47J 31/3695; A47J 31/3676; A47J 31/0647
(Continued)

(56) References Cited

U.S. PATENT DOCUMENTS 4,775,048 A 10/1988 Baecchi
4,787,299 A 11/1988 Levi
(Continued)

FOREIGN PATENT DOCUMENTS

AU 2013305155 3/2015
CA 2765324 11/2010
(Continued)

OTHER PUBLICATIONS

International Search Report and Written Opinion, PCT/NL2017/050509, 11 pages (dated Jun. 5, 2018).
(Continued)

*Primary Examiner* — Reginald Alexander
(74) *Attorney, Agent, or Firm* — Fitch, Even, Tabin & Flannery LLP

(57) ABSTRACT

A system for preparing beverage, including a second exchangeable capsule, and arranged for optionally including a first exchangeable capsule. The second capsule is larger than the first capsule. The system also includes an apparatus with a first brew chamber part and a second brew chamber part forming a brew chamber for selectively holding one of the capsules and a fluid dispensing device for supplying fluid under pressure to the first brew chamber part. The first brew chamber part has a cavity for selectively holding the first or second capsule. The first brew chamber part may include a first volume not occupied by the first exchangeable capsule when holding this capsule. The first brew chamber part may include a second volume not occupied by the second
(Continued)

exchangeable capsule when holding this capsule. The invention further relates to a brew chamber assembly, an apparatus, a set of capsules, a method of preparing a beverage, a capsule, and several adapters.

19 Claims, 13 Drawing Sheets

(51) Int. Cl.
*A47J 31/44* (2006.01)
*A47J 31/06* (2006.01)

(52) U.S. Cl.
CPC ........ *A47J 31/4403* (2013.01); *A47J 31/3623* (2013.01); *A47J 31/3676* (2013.01)

(58) Field of Classification Search
USPC .................................................. 99/302 P, 295
See application file for complete search history.

(56) References Cited

U.S. PATENT DOCUMENTS

| | | | |
|---|---|---|---|
| 5,197,374 A | 3/1993 | Fond | |
| 5,964,142 A | 10/1999 | Tio | |
| 6,026,732 A | 2/2000 | Kollep | |
| 7,216,582 B2 | 5/2007 | Yoakim | |
| 7,337,704 B2 | 3/2008 | Hammad | |
| 7,607,385 B2 | 10/2009 | Halliday | |
| 8,210,096 B2 | 7/2012 | Fin | |
| 8,365,585 B2 | 2/2013 | Barra | |
| 8,770,095 B2 | 7/2014 | Pecci | |
| 8,836,956 B2 | 9/2014 | Jarisch | |
| 8,904,922 B2 * | 12/2014 | Pagano | A47J 31/407 99/295 |
| 9,167,934 B2 | 10/2015 | Höglauer | |
| 9,439,532 B2 | 9/2016 | Crarer | |
| 9,801,494 B2 | 10/2017 | Castellani | |
| 9,986,869 B2 | 6/2018 | Bonacci | |
| 2001/0011502 A1 | 8/2001 | Bonanno | |
| 2002/0023543 A1 | 2/2002 | Schmed | |
| 2003/0066431 A1 | 4/2003 | Fanzutti | |
| 2004/0197444 A1 | 10/2004 | Halliday | |
| 2005/0223904 A1 | 10/2005 | Laigneau | |
| 2006/0075902 A1 * | 4/2006 | Magno | A47J 31/3638 99/279 |
| 2006/0107841 A1 | 5/2006 | Schifferle | |
| 2006/0266224 A1 | 11/2006 | Hammad | |
| 2008/0006159 A1 | 1/2008 | Fischer | |
| 2008/0245236 A1 * | 10/2008 | Ternite | A47J 31/407 99/295 |
| 2010/0064899 A1 | 3/2010 | Aardenburg | |
| 2011/0000377 A1 | 1/2011 | Favre | |
| 2011/0142996 A1 | 6/2011 | Krueger | |
| 2011/0185910 A1 | 8/2011 | Ryser | |
| 2011/0297005 A1 | 12/2011 | Mariller | |
| 2012/0240779 A1 | 9/2012 | Perentes | |
| 2013/0099597 A1 | 4/2013 | Perentes | |
| 2013/0220138 A1 | 8/2013 | Deuber | |
| 2013/0247774 A1 | 9/2013 | Macchiavelli | |
| 2013/0323366 A1 | 12/2013 | Gerbaulet | |
| 2014/0053734 A1 | 2/2014 | Santi | |
| 2014/0227414 A1 | 8/2014 | Perentes | |
| 2014/0263780 A1 | 9/2014 | Day, Jr. | |
| 2014/0290495 A1 | 10/2014 | Perentes | |
| 2014/0299000 A1 | 10/2014 | Hanneson | |
| 2015/0027375 A1 | 1/2015 | Cha | |
| 2015/0059587 A1 | 3/2015 | Colleoni | |
| 2015/0082989 A1 | 3/2015 | Besson | |
| 2015/0104550 A1 | 4/2015 | Oh | |
| 2015/0147448 A1 | 5/2015 | Lo Foro | |
| 2015/0157169 A1 | 6/2015 | Krüger | |
| 2015/0158665 A1 | 6/2015 | Krüger | |
| 2015/0183577 A1 | 7/2015 | Talon | |
| 2015/0225169 A1 | 8/2015 | Jarisch | |
| 2015/0238039 A1 | 8/2015 | Fischer | |
| 2015/0272375 A1 | 10/2015 | Flick et al. | |
| 2015/0272376 A1 | 10/2015 | Flick | |
| 2015/0272380 A1 | 10/2015 | Flick | |
| 2015/0342394 A1 | 12/2015 | Bonacci et al. | |
| 2016/0045060 A1 * | 2/2016 | Flick | G06K 7/01 99/295 |
| 2016/0150907 A1 | 6/2016 | Bolognese et al. | |
| 2016/0157666 A1 | 6/2016 | Brandsma | |
| 2016/0309946 A1 | 10/2016 | Gunstone | |
| 2017/0143157 A1 | 5/2017 | Tentorio | |
| 2019/0167031 A1 | 6/2019 | Rijskamp | |
| 2019/0274467 A1 | 9/2019 | Ogink | |
| 2019/0335940 A1 | 11/2019 | Rijskamp | |
| 2019/0335942 A1 | 11/2019 | Rijskamp | |
| 2019/0343324 A1 | 11/2019 | Rijskamp | |
| 2019/0343325 A1 | 11/2019 | Ogink | |
| 2020/0000265 A1 | 1/2020 | Ogink | |
| 2020/0000268 A1 | 1/2020 | Ogink | |

FOREIGN PATENT DOCUMENTS

| | | | |
|---|---|---|---|
| CN | 1232212 | 10/1999 | |
| CN | 1612831 | 5/2005 | |
| CN | 101123905 | 2/2008 | |
| CN | 101389551 | 3/2009 | |
| CN | 100480150 | 4/2009 | |
| CN | 201481108 | 5/2010 | |
| CN | 101795605 | 8/2010 | |
| CN | 102188161 | 9/2011 | |
| CN | 102245065 | 11/2011 | |
| CN | 103002781 | 3/2013 | |
| CN | 103124509 | 5/2013 | |
| CN | 202960135 | 6/2013 | |
| CN | 103829804 A | 6/2014 | |
| CN | 104244780 | 12/2014 | |
| CN | 104884368 | 9/2015 | |
| CN | 105431358 | 3/2016 | |
| CN | 105813958 | 7/2016 | |
| DE | 10334526 | 2/2005 | |
| DE | 202007002910 | 5/2007 | |
| DE | 102005049624 | 7/2007 | |
| DE | 202012005191 | 6/2012 | |
| DE | 102012010394 | 11/2013 | |
| DE | 202015100812 | 5/2016 | |
| DE | 202015100813 | 5/2016 | |
| DE | 202015100814 | 5/2016 | |
| DE | 202015101266 | 6/2016 | |
| EP | 0449533 | 10/1991 | |
| EP | 0451980 | 10/1991 | |
| EP | 1183975 | 3/2002 | |
| EP | 1 208 782 A1 | 5/2002 | |
| EP | 1360919 | 11/2003 | |
| EP | 1518484 | 3/2005 | |
| EP | 1555219 | 7/2005 | |
| EP | 1559351 | 8/2005 | |
| EP | 1767129 | 3/2007 | |
| EP | 1842467 | 10/2007 | |
| EP | 1859713 | 11/2007 | |
| EP | 1859714 B1 | 11/2007 | |
| EP | 2033551 | 3/2009 | |
| EP | 2071986 | 6/2009 | |
| EP | 2071987 | 6/2009 | |
| EP | 2230195 A1 | 9/2010 | |
| EP | 2374383 B1 | 11/2011 | |
| EP | 2409608 | 1/2012 | |
| EP | 2409609 | 1/2012 | |
| EP | 2471420 | 7/2012 | |
| EP | 2687133 | 1/2014 | |
| EP | 2 833 766 B1 | 2/2015 | |
| EP | 2656755 B1 * | 8/2015 | A47J 31/3633 |
| RU | 2012128493 A | 1/2014 | |
| RU | 2591768 C2 | 7/2016 | |
| RU | 2626940 | 8/2017 | |
| WO | 0243541 | 6/2002 | |
| WO | 2005016092 | 2/2005 | |
| WO | 2006005736 | 1/2006 | |
| WO | 2006014936 | 2/2006 | |

(56) References Cited

FOREIGN PATENT DOCUMENTS

| | | |
|---|---|---|
| WO | 2006066625 | 6/2006 |
| WO | 2007016977 | 2/2007 |
| WO | 2007096196 | 8/2007 |
| WO | 2008004116 | 1/2008 |
| WO | 2008096385 | 8/2008 |
| WO | 2009016455 | 2/2009 |
| WO | 2009027131 | 3/2009 |
| WO | 2010013274 | 2/2010 |
| WO | WO-2010029512 A1 * 3/2010 .......... A47J 31/3628 |
| WO | 2010076698 | 7/2010 |
| WO | 2010134054 | 11/2010 |
| WO | 2011015978 | 2/2011 |
| WO | WO-2011/042401 A2 | 4/2011 |
| WO | 2011069830 | 6/2011 |
| WO | 2011076750 | 6/2011 |
| WO | WO-2011/069829 A1 | 6/2011 |
| WO | 2011113854 A2 | 9/2011 |
| WO | 2011121125 | 10/2011 |
| WO | 2012001115 | 1/2012 |
| WO | 2012123440 | 9/2012 |
| WO | 2012156167 | 11/2012 |
| WO | 2013007776 | 1/2013 |
| WO | 2013008012 | 1/2013 |
| WO | WO-2013/079814 A1 | 6/2013 |
| WO | 2013144922 | 10/2013 |
| WO | 2014012778 | 1/2014 |
| WO | 2014012779 | 1/2014 |
| WO | 2014027079 | 2/2014 |
| WO | 2014029685 | 2/2014 |
| WO | 2014041605 | 3/2014 |
| WO | 2014056641 | 4/2014 |
| WO | 2014056642 | 4/2014 |
| WO | 2014056810 | 4/2014 |
| WO | 2014056821 | 4/2014 |
| WO | 2014060370 | 4/2014 |
| WO | WO-2014/056730 A1 | 4/2014 |
| WO | WO-2014/056862 A1 | 4/2014 |
| WO | 2014082975 | 6/2014 |
| WO | 2014082976 | 6/2014 |
| WO | 2014092406 | 6/2014 |
| WO | 2014096120 | 6/2014 |
| WO | 2014096121 | 6/2014 |
| WO | 2014132158 | 9/2014 |
| WO | 2014174462 | 10/2014 |
| WO | 2014183219 | 11/2014 |
| WO | 2014183783 | 11/2014 |
| WO | 2015004613 | 1/2015 |
| WO | 2015056022 | 4/2015 |
| WO | 2015082663 | 6/2015 |
| WO | 2015082664 | 6/2015 |
| WO | 2015086371 | 6/2015 |
| WO | WO-2015/082662 A1 | 6/2015 |
| WO | WO-2015/109052 A1 | 7/2015 |
| WO | 2015124627 | 8/2015 |
| WO | 2015158838 | 10/2015 |
| WO | WO-2015/144356 A1 | 10/2015 |
| WO | WO-2015/155145 A1 | 10/2015 |
| WO | WO-2015/173123 A1 | 11/2015 |
| WO | WO-2015/193744 A1 | 12/2015 |
| WO | 2016012562 | 1/2016 |
| WO | 2016055633 | 4/2016 |
| WO | 2016071795 | 5/2016 |
| WO | 2016082029 | 6/2016 |

OTHER PUBLICATIONS

International Search Report and Written Opinion, PCT/NL2017/050510, 10 pages (dated Nov. 20, 2017).
International Search Report and Written Opinion, PCT/NL2017/050511, 9 pages (dated Nov. 30, 2017).
International Search Report and Written Opinion, PCT/NL2017/050512, 10 pages (dated Nov. 27, 2017).
International Search Report and Written Opinion, PCT/NL2017/050513, 8 pages (dated Dec. 22, 2017).
International Search Report and Written Opinion, PCT/NL2017/050514, 8 pages (dated Nov. 23, 2017).
International Search Report and Written Opinion, PCT/NL2017/050515, 10 pages (dated Nov. 27, 2017).
International Search Report and Written Opinion, PCT/NL2017/050519, 11 pages (dated Nov. 29, 2017).
International Search Report and Written Opinion, PCT/NL2017/050521, 8 pages (dated Dec. 4, 2017).
International Search Report and Written Opinion, PCT/NL2017/050522, 17 pages (dated Jan. 17, 2018).
International Preliminary Report on Patentability, PCT/NL2017/050509, 7 pages (dated Feb. 5, 2019).
International Preliminary Report on Patentability, PCT/NL2017/050510, 7 pages (dated Feb. 5, 2019).
International Preliminary Report on Patentability, PCT/NL2017/050511, 7 pages (dated Feb. 5, 2019).
International Preliminary Report on Patentability, PCT/NL2017/050512, 6 pages (dated Feb. 5, 2019).
International Preliminary Report on Patentability, PCT/NL2017/050513, 6 pages (dated Feb. 5, 2019).
International Preliminary Report on Patentability, PCT/NL2017/050514, 6 pages (dated Feb. 5, 2019).
International Preliminary Report on Patentability, PCT/NL2017/050515, 6 pages (dated Feb. 5, 2019).
International Preliminary Report on Patentability, PCT/NL2017/050519, 9 pages (dated Feb. 5, 2019).
International Preliminary Report on Patentability, PCT/NL2017/050521, 5 pages (dated Feb. 5, 2019).
International Preliminary Report on Patentability, PCT/NL2017/050522, 12 pages (dated Feb. 5, 2019).
Manual Jura Nespresso English, 22 pages.
Nespresso-I, 8 pages.
Nespresso-II, 2 pages (2003).
Nespresso-III, 2 pages (2003).
Nespresso-IV, 7 pages.
Nespresso-V, 5 pages (Apr. 2015).

* cited by examiner

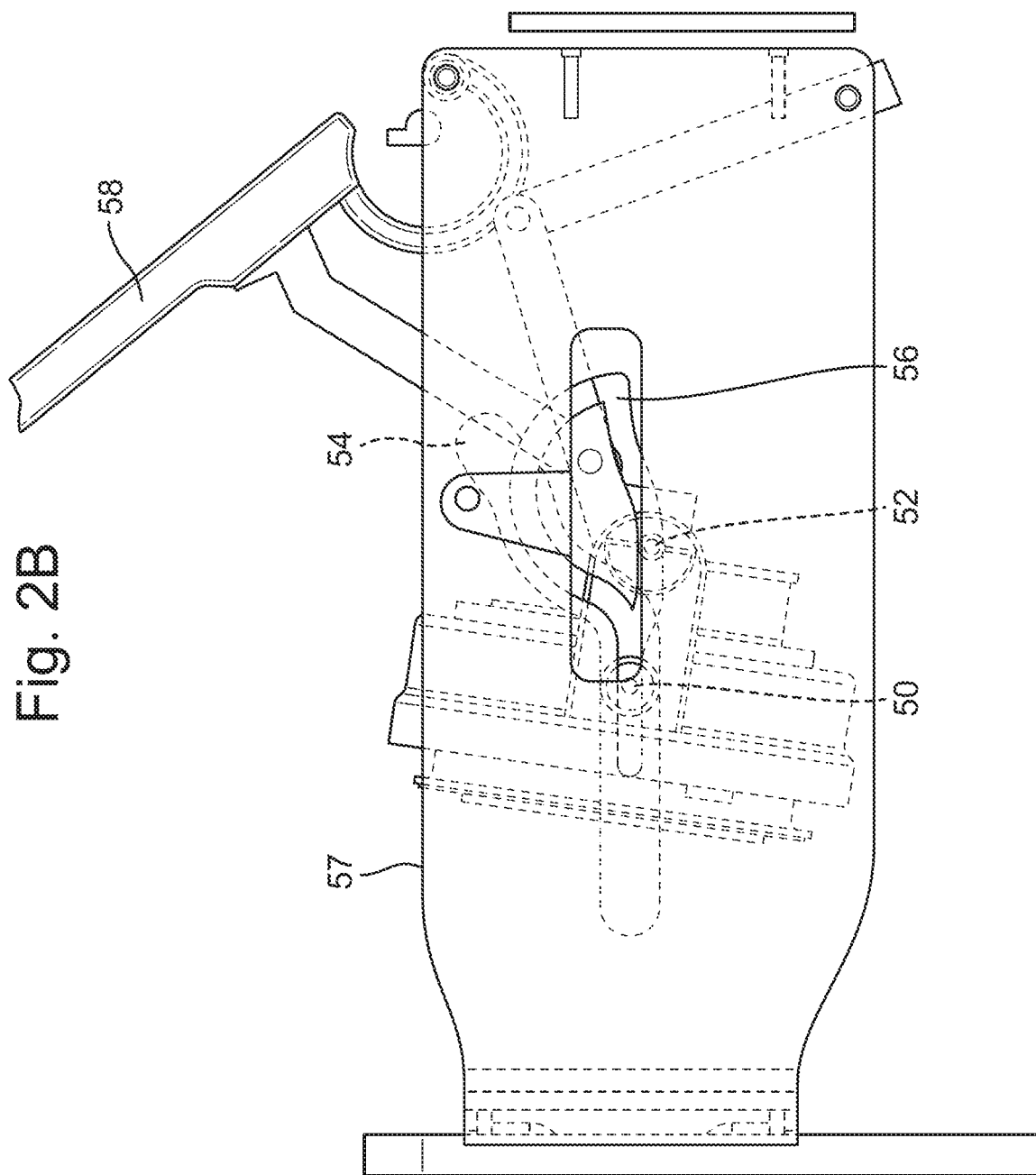

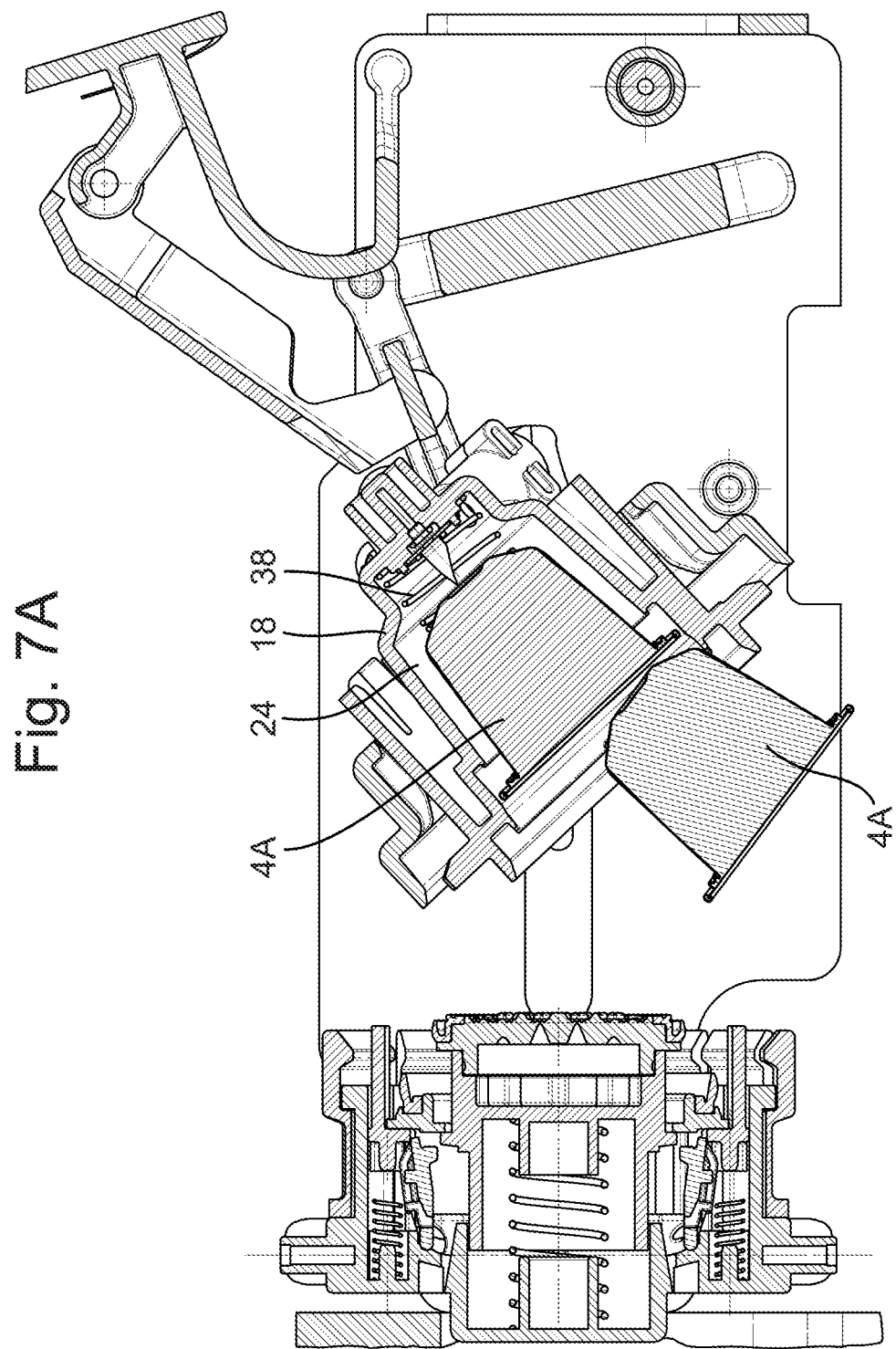

SYSTEM FOR PREPARING A BEVERAGE

CROSS-REFERENCE TO RELATED APPLICATIONS

This application is a continuation of PCT/NL2017/050516 filed Aug. 3, 2017, which claims the benefit of and priority to Netherlands Patent Application No. NL 2017281 filed Aug. 3, 2016, the entire contents of each of which are hereby incorporated herein by reference.

BACKGROUND

The invention generally relates to a system for preparing a beverage. The invention also relates to a brew chamber assembly, an apparatus comprising such a brew chamber assembly, a set of capsules, a method for preparing a beverage, a capsule, and several brew chamber adapters. More specifically the invention relates to a system for preparing a beverage using a capsule.

Capsule based beverage preparation machines are very popular, mainly because they enable the user to brew a large variety of different types and tastes of beverages, typically at high quality. In this perspective, these types of beverage preparation machines are a major step forward compared to the old fashioned manual ways of preparing such beverages.

However, regardless of these benefits, designing a capsule beverage preparation machine that is able to prepare different types and tastes of beverages in different quantities dependent on the type (e.g. long drinks, short drinks, different sizes of cups) remains to be challenging. Various solutions are known applying differently sized capsules or capsules with different amounts of fillings. The latter of these typically fails to provide an optimal solution, as beverage quality is dependent on many factors that are negatively affected by storing different amounts of beverage ingredients in a single sized capsule.

Using differently sized capsules for different quantities helps to overcome the quality issues, but provides its own drawbacks. For example, a first challenge encountered is to design a machine that is able to receive such different sizes of capsules. In addition, a manufacturer of capsules typically desires the capsules to have a same appearance, i.e. a same look and feel, as this makes the capsules recognizable in a store for users. The combination of these two challenges provides additional difficulties to be resolved. The combined requirements of same appearance and different sizes, for example, render it difficult to design a machine having a single brewing chamber able to receive all capsules, whilst not compromising quality of the beverage produced. For example, smaller capsules may not fittingly be comprised in the brew chamber, causing waste water to accumulate in the space between the smaller capsule and an enclosing member. This may jeopardize the quality of the beverage produced.

SUMMARY

It is object of the present invention to overcome the abovementioned disadvantage and to meet the challenges described. In particular, it is an object of the invention to provide a system for the preparation of beverages of predefined quantities that is suitable for being used with differently sized capsules having a same overall appearance, without jeopardizing quality of the beverages produced.

To this end, there is provided herewith a system for preparing a predetermined quantity of beverage suitable for consumption, including: a second exchangeable capsule, the system being arranged for optionally including a first exchangeable capsule, wherein the second exchangeable capsule is larger than the first exchangeable capsule, and an apparatus including a first brew chamber part and a second brew chamber part forming a brew chamber for selectively holding one of the first and second exchangeable capsules and a fluid dispensing device for supplying an amount of fluid, such as water, under pressure to the first brew chamber part, the first brew chamber part having a cavity for selectively holding one of the first and second exchangeable capsules. The first brew chamber part may include a first volume not occupied by the first exchangeable capsule when the brew chamber holds the first exchangeable capsule, which first volume is arranged for holding part of the second exchangeable capsule when the brew chamber holds the second capsule. The first brew chamber part may include a second volume not occupied by the second exchangeable capsule when the brew chamber holds the second capsule, which second volume is arranged for receiving the second brew chamber part when the brew chamber holds the first capsule.

In accordance with the present invention, the brew chamber is arranged such that both for the first capsule and for the second capsule some waste water will be present in the chamber, rather than only waste water for one of the two capsules. Therefore, the waste water volume can be minimized for both modes of operation, i.e. using either one of the first and the second capsule.

In particular, when the second capsule is larger than the first capsule, the first capsule cannot completely fill the brew chamber. Therefore, a volume will be left void in case the first capsule will be loaded into the cavity of the first brew chamber part. However, in the present design, the first brew chamber part comprises a second volume in the cavity that is arranged for receiving second brew chamber part in case the brew chamber is loaded with the (smaller) first capsule. This allows the cavity volume to be decreased in case it is loaded with the first capsule and closed by the second brew chamber part. However, in accordance with the invention, the decrease in volume of the cavity will only partially overcome the volume difference between the full cavity volume and the volume taken by the first capsule. This is because quality of the beverage produced may be optimized for all types of beverage and modes of operation in case the amount of waste water built-up is balanced between the modes.

Thus, in accordance with the present invention, some dead space in the cavity is deliberately allowed in case the cavity is loaded with the second and larger capsule, in order to reduce the dead space when the cavity is loaded with the first capsule such as to balance the amount of waste water between modes of operation. Hence, when the brew chamber holds the first capsule, a first volume will be present in the cavity that would otherwise be taken by the second capsule. Moreover, when the brew chamber holds the second capsule it will fill the cavity such that the first volume is taken by the capsule, however the second volume in the cavity will be left void. This second volume is a volume that gives way for the second brew chamber part in case the brew chamber holds the first capsule.

Preferably, in accordance with some embodiments, the first and second capsules have substantially the same length to diameter ratio. In particular, in accordance with these embodiments, the first and second capsules are designed to have a "family" look and feel. The capsules can e.g. have similar height to width ratios. The second capsule, in appearance, may be a (true) magnification in size and shape of the first capsule, to provide it with the additional capacity for holding beverage ingredients.

In these embodiments, because the first brew chamber part must be designed to hold the second capsule, loading it with the smaller first capsule may cause a circumferential volume around the body of the first capsule to be left void inside the cavity. Thus, in some of these embodiments, the first volume will be a circumferential volume around the body of the first capsule in the first brewing chamber part. The first capsules may in these embodiments be held in place by a suitable design of the interior, i.e. the cavity, formed by the first brew chamber part cooperating with the second brew chamber part. For example, the first capsule may lie deeper into the interior of the first brew chamber part, whereas the second brew chamber part is extended into a part—i.e. a part including the second volume—of the cavity. The dead space that may receive excess or waste water will not include the second volume.

In order to enable the system to provide a first volume and a second volume dependent on the type of capsule, in accordance with some embodiments, for example, the second brew chamber part is movable into a first or second position, wherein in the first position the first and second brew chamber parts form the brew chamber for holding the first capsule, and in the second position the first and second brew chamber parts form the brew chamber for holding the second capsule.

Moreover, in some embodiments, the apparatus includes a second sealing member for sealing the first and the second brew chamber part when holding the second capsule. The second capsule can have a sealing surface for sealing against the second sealing member, wherein the sealing surface has an inner diameter that is larger than an outer diameter of the first capsule body. By providing the sealing surface having an inner diameter that is larger than an outer diameter of the first capsule, a design may be achieved wherein the first capsule may be inserted into the first brew chamber part through the same open end of the first brew chamber part. The second brew chamber part may for example comprise an extraction plate for abutting against an exit face of the first or second capsule. For example, the extraction plate may include a central portion and a peripheral portion, wherein the central portion may be movable relative to the peripheral portion from the second position to the first position. In the second position, the extraction plate abuts against the exit face of the second capsule. In case a first capsule is inserted, the central portion of the extraction plate extends further towards the first position. For example, the central portion may be axially moveable relative to the peripheral portion. The system may include a locking mechanism for locking the central portion in or near the first position, or in a position closer to the first position than the second position, when the cavity holds the first capsule.

Sealing of the brew chamber when holding any one of the first or second capsules is relatively important in order to enable sufficient pressure to be built up in the brew chamber and prevent leakage. This may be achieved in various ways. However, in particular in a system in accordance with the present invention, it may be advantageous to provide the capsule with flange-like rims against which a sealing engagement may be achieved. The flange-like rims at the same time may keep the capsules, e.g. the smaller first capsule, in place within the brew chamber during preparation of the beverage. For example, in accordance with some embodiments, the second capsule has a second flange-like rim arranged for providing a fluid sealing engagement with the second sealing member. In accordance with some further embodiments, the apparatus includes a first sealing member for sealing the first and second brew chamber part when holding the first capsule, wherein the first capsule has a first flange-like rim arranged for providing a fluid sealing engagement with the first sealing member.

Additionally or alternatively, the first sealing member can include a resilient lip arranged to provide a self-reinforcing sealing engagement between the central portion and the peripheral portion when forming the brew chamber for holding the second exchangeable capsule. The second sealing member may then for example leak some liquid, for example water, to inflate said resilient lip of the first sealing member.

Fixation or immobilization of the capsules during preparation of the beverage, as well as the above described sealing, may be achieved by fitting the first brew chamber part with one or more annular abutment surfaces. Capsules having flange-like rims may be made to abut against such annular abutment surfaces during insertion into the first brew chamber part. For example, in accordance with some embodiments, the first brew chamber part comprises a first annular abutment surface located in the cavity for cooperating with the first capsule. Where the cavity of the first brew chamber part includes a bottom section and one or more peripheral walls, in accordance with some embodiments, the first annular abutment surface may be located in at least one of the peripheral walls at a distance of at least a length of the first capsule from the bottom section. As referred to above, the first flange-like rim may be arranged for abutting against the first annular abutment surface. This enables the first capsule to be held in place lying deeper into the first brew chamber part than the second capsule. The first volume left void around the first capsule is therefore decreased, and may even be minimalized by further design. For example, where capsules are substantially frusto-conical having a flange-like rim as defined, whereas the first and second capsules substantially have the same length versus width ratios, the angle of the slanted walls of the frusto-conical capsules determines the size of the first volume together with the size ratio of the second capsule with respect to the first capsule. Larger angles of the slanted circumferential walls of the capsules result in smaller first volumes—i.e. dead space—in the first brew chamber part.

Likewise, in accordance with some embodiments, the first brew chamber part comprises a second annular abutment surface for cooperating with the second capsule. In some of these embodiments, the second annular abutment surface is located at or near an open end of the first brew chamber part. As may be appreciated, alternative embodiments may include a second abutment surface elsewhere in the cavity, e.g. somewhere inside the cavity, thereby providing room for additional abutment surfaces to enable additional—even larger—capsule types to be inserted in the brew chamber. In embodiments wherein the second capsule comprises a second flange-like rim, the second flange-like rim may be arranged for abutting against the second annular abutment surface, e.g. to enable immobilization of the capsule during preparation of the beverage. The second annular abutment surface can have an inner diameter that is larger than an outer diameter of the first capsule, e.g. an outer diameter of a flange of the first capsule.

Moreover, in some embodiments, the second capsule can have an abutment area for abutting against the second annular abutment surface. The abutment area has an inner diameter that is larger than an outer diameter of the first capsule. By providing the abutment area having an inner diameter that is larger than an outer diameter of the first capsule, a design may be achieved wherein the first capsule may be inserted into the first brew chamber part through the same open end of the first brew chamber part.

In accordance with some embodiments, the cavity comprises a second portion defining the second volume, the second portion having a cross section larger than or equal to a diameter of the first annular abutment surface. This enables easy insertion of a first capsule. However, in accordance with some embodiments, at least a part of the second portion is shaped corresponding with the second capsule for following a shape of the body where the cross section of the body is larger than or equal to the diameter of the first annular abutment surface, for minimizing the second volume. In particular, in addition to easy insertion of the first capsule, this further enables to limit the size of the second volume to a minimal size required to enable easy insertion of the first capsule into the brew chamber, thereby reducing the amount of waste water produced during preparation of a beverage.

In accordance with some embodiments, the cavity comprises a first portion defining the first volume, said first portion having a shape and size corresponding with the second capsule for receiving the second capsule therein. In this embodiment, the shape and size of the second capsule is made to fit well into the first portion of the first brew chamber part, thereby limiting the dead space in the brew chamber to only the second volume in case the second capsule is held in the brew chamber. It provides benefits, as described above to use capsules shaped such as to minimize the first volume in case a first capsule is held in the brew chamber. This may for example be achieved in accordance with some embodiments, wherein the first and the second capsule each comprise a cup-shaped body having slanted circumferential walls providing a gradually decreasing cross section in a direction towards a bottom of the body. This includes frusto-conical, as well as frusto-pyramid and similar shaped capsules. As an alternative to frusto-conical, the capsules in accordance with these embodiments, also include capsules that are shaped having curved circumferential walls, e.g. bullet shaped or truncated bullet shaped. Without departing from the present embodiments, the circumferential walls of the capsules may comprise smooth surfaces or may alternatively comprise surface structures, such as serrated walls, walls having notches or dimples, corrugated walls, etcetera. The skilled person is able to identify other embodiments, based on this description.

Preferably, in accordance with particular one of the above embodiments, the slanted circumferential walls of the first and the second capsule are slanted at substantially the same angle relative to an axial direction of the capsules. This provides the capsules with a same appearance, and ensures that the first capsule will fit into the cavity.

Slightly deviating from providing a same appearance between the first and second capsule, in embodiments wherein the first capsule comprises a first flange-like rim, an upper end part of the body of the second capsule is cylindrically shaped, optionally having a cross section corresponding with the cross section of the first flange-like rim of the first capsule. This will provide a second capsule having a flowerpot-like shape. The advantage of this is that the cylindrical upper end part of the body of the second capsule, in view of it's cross-section corresponding with the cross-sectional diameter of the first flange-like rim of the first capsule, fills up the second volume when inserted into the first brew chamber part. Hence, less waste water will be produced in that case. As may be appreciated, without deviating from the present embodiments, it is optional that the cross section of this flowerpot-like capsule corresponds with the cross-sectional diameter of the first flange-like rim of the first capsule. Capsules having cylindrical upper end parts with smaller or larger diameters may also be applied, albeit that in that case it is not always ascertained that no waste water is produced.

In view of the fact that capsules may not be cylindrical, it may be defined that in accordance with some embodiments, a ratio between a length of the body and a bottom diameter of the body is substantially the same for the first and the second capsule. Moreover, in accordance with some embodiments, the first capsule including a first flange-like rim, and the second capsule comprising a second flange-like rim, wherein a ratio between the length of the body and a diameter of the first flange-like rim is substantially the same as a ratio between the length of the body and a diameter of the second flange-like rim.

Optionally, the cavity of the first brew chamber part is arranged for receiving the first or second capsule. The cavity of the first brew chamber part can be a predetermined cavity arranged for holding the first or second capsule. The cavity can have an invariable shape for holding the first or second capsule. The first brew chamber part can be arranged for holding the first or second capsule without changing a configuration of the first brew chamber part. The first brew chamber part can be a monolithic part.

As defined herewith, the use of a first exchangeable capsule is optional to the system, as it may be well used with only the second type of capsules. Thus, in some embodiments, the system only includes the second type of capsules, however, in accordance with some other embodiments, the system further includes the optional first exchangeable capsule. Yet in accordance with some embodiments, the system may either include other types of capsules than the first and second exchangeable capsules. For example, the abovementioned flowerpot-like capsules have already been mentioned, which could be used as an additional or alternative type of capsule. Moreover, in accordance with embodiments, the system may further or alternatively include at least one element of a group comprising: a third exchangeable capsule having a body suitably shaped such as to be receivable by the first brew chamber part, and such as to partially fill the cavity including the first volume, the third exchangeable capsule having a substantially same length as the first capsule; or a fourth capsule including a body having a substantially same shape and cross section as the second capsule but having a length smaller than the length of the second capsule, the body of the fourth capsule being arranged for being manually or mechanically opened at a bottom prior to insertion into the first brew chamber part; a fifth capsule having an identical shape and size as one of the first or the second capsule, the fifth capsule being arranged for opening and closing thereof for enabling refilling of a beverage ingredient therein; a sixth capsule in combination with a brew chamber adapter, wherein the brew chamber adapter comprises an external shape that corresponds with an internal shape of the first brew chamber for cooperating therewith, and wherein the brew chamber adapter comprises an internal shape that corresponds with an external shape of the sixth capsule, for enabling the sixth capsule to be inserted in the first brew chamber part; a seventh exchangeable capsule having a body suitably shaped such as to be receivable by the first brew chamber part, the seventh capsule including an open section for enabling refilling of a beverage ingredient therein; an eighth exchangeable capsule having a cup-shaped body wherein an upper end part of the body is shaped such as to at least partially fill the second volume; a ninth exchangeable capsule having a cup-shaped body wherein an upper end part of the body is shaped such as to at least partially correspond to the cavity, such as to at least partially fill the second volume; a first capsule complementary brew chamber adapter suitably shaped such as to fill or close the first volume when the brew chamber holds the first exchangeable capsule; or a second capsule complementary brew chamber adapter suitably shaped such as to fill or close the second volume when the brew chamber holds the second exchangeable capsule. The advantages of the above-mentioned first capsule brew chamber adapter and second capsule brew chamber adapter is that these adapters enable to further reduce the amount of waste water produced during brewing.

The cavity of the first brew chamber part may be correspondingly shaped dependent on the capsules used, and including first and second volumes as defined. In accordance with some embodiments, the cavity has a shape corresponding to an element of a group comprising: frusto-conical, frusto-pyramid, cylindrical, cubical, block shaped, stepwise cylindrical, stepwise frusto-conical, stepwise frusto-pyramid, stepwise cubical, stepwise block shaped, bullet shaped, or truncated bullet shaped.

In accordance with some aspects, the system is not limited to only include the apparatus described, but may include further apparatuses or brew chambers specially adapted to hold a certain type or certain types of capsules. To this end, in accordance with some embodiments, the system may further include a further apparatus being arranged for receiving exclusively one of the first or the second capsule, wherein the further apparatus includes a third brew chamber part and a fourth brew chamber part forming a further brew chamber for holding said exclusive one of the first or the second capsule, and a fluid dispensing device for supplying an amount of fluid, such as water, under pressure to the third brew chamber part, the third brew chamber part having a cavity being shaped for holding the exclusive one of the first or second capsule. For example, an additional apparatus with a brew chamber exclusively suitable for holding the first exchangeable capsule may be provided. Alternatively or additionally, an apparatus with a brew chamber exclusively suitable for holding the second exchangeable capsule may be provided in addition to the apparatus described above. Even, apparatuses for holding one or more of the above-mentioned third, fourth, fifth, sixth, seventh, eighth, ninth or flowerpot-like capsules may be added, without departing from the present invention.

In accordance with a second aspect of the invention, there is provided a brew chamber assembly comprising a first brew chamber part and a second brew chamber part arranged for cooperating with each other for forming a brew chamber for selectively holding one of a first and a second exchangeable capsule, wherein the assembly is arranged for cooperating with a fluid dispensing device for supplying an amount of fluid, such as water, under pressure to the first brew chamber part, wherein the first brew chamber part having a cavity for selectively holding the one of the first and second exchangeable capsules, wherein the first brew chamber part is shaped such as to include a first volume not occupied by the first exchangeable capsule when the brew chamber holds the first exchangeable capsule, which first volume is arranged for holding part of the second exchangeable capsule when the brew chamber holds the second capsule, and wherein the first brew chamber part is further shaped such as to include a second volume not occupied by the second exchangeable capsule when the brew chamber holds the second capsule, which second volume is arranged for receiving the second brew chamber part when the brew chamber holds the first capsule.

Embodiments of the brew chamber assembly may be in line with or correspond with the specific embodiments described for the system above.

In accordance with a third aspect of the invention, there is provided an apparatus for preparing a predetermined quantity of beverage suitable for consumption, using a second exchangeable capsule and optionally using a first exchangeable capsule, wherein the second capsule is larger than the first capsule, the apparatus including a brew chamber assembly according to the second aspect.

Yet in accordance with a fourth aspect of the invention, there is provided a set of capsules for use in a system as described herein, or for use in a brewing assembly as described herein, or for use in an apparatus as described herein, the set including a first exchangeable capsule and a second exchangeable capsule, wherein the second capsule is larger than the first capsule, wherein each one of the first and second capsule having a shape and size such as to be receivable in a cavity of a first brew chamber part, and such that the cavity is closeable by a second brew chamber part cooperating with the first brew chamber part for forming a brew chamber, the first and second brew chamber part being comprised by an apparatus arranged for preparing a predetermined quantity of beverage suitable for consumption by selectively using one of the first or second capsule, wherein the first capsule is shaped such as to form a first volume within the cavity between a body of the first capsule and a peripheral wall of the first brew chamber part, when the first capsule resides in the cavity, which first volume is arranged for holding part of the second capsule when the brew chamber holds the second capsule instead of the first capsule, and wherein the second capsule is shaped such as to form a second volume within the cavity between a body of the second capsule and a peripheral wall of the first brew chamber part, when the second capsule resides in the cavity, which second volume is arranged for receiving the second brew chamber part when the brew chamber holds the first capsule instead of the second capsule. In specific embodiments of the invention in accordance with this aspect, the first and second capsules having substantially the same length to diameter ratio. In particular, the capsules can e.g. have similar height to width ratios. The second capsule, in appearance, may be a (true) magnification in size and shape of the first capsule, to provide it with the additional capacity for holding beverage ingredients. This is not purely to provide the capsule with a same visual appearance, but it additional provides the advantage of enabling a brew chamber suitable for holding any type of these capsules whilst minimizing and balancing waste water amount, as described.

In accordance with a fifth aspect of the invention, there is provided a method preparing a predetermined quantity of beverage suitable for consumption, the method comprising the steps of: selecting at least one of a first exchangeable capsule or a second exchangeable capsule, wherein the second exchangeable capsule is larger than the first exchangeable capsule, and inserting the selected one of first or second capsule in a first brew chamber part of an apparatus including the first brew chamber part and a second brew chamber part forming a brew chamber, the brew chamber being arranged for holding a selected one of the first exchangeable capsule and the second exchangeable capsule; supplying, using a fluid dispensing device, an amount of fluid, such as water, under pressure to the first brew chamber part, the first brew chamber part having a cavity holding the selected one of the first and the second exchangeable capsules; said inserting including: when the first capsule is selected, forming a first volume in the first brew chamber part, wherein the first volume is not occupied by the first exchangeable capsule when the brew chamber holds the first exchangeable capsule, wherein the first volume is arranged for holding part of the second exchangeable capsule in case the brew chamber was to hold the second capsule, and when the second capsule is selected, forming a second volume in the first brew chamber part, wherein the second volume is not occupied by the second exchangeable capsule when the brew chamber holds the second capsule, wherein second volume is arranged for receiving the second brew chamber part in case the brew chamber was to hold the first capsule.

Yet, in accordance with a sixth aspect of the invention, there is provided a capsule for use in a method according to the fifth aspect, or for use in a set of capsules according to the fourth aspect, or for use in a system according to the first aspect, or in an assembly according to second aspect, or in an apparatus according to the third aspect.

Moreover, in accordance with a seventh aspect of the invention, there is provided a brew chamber adapter for use in a method according to the fifth aspect, or for use in a set of capsules according to the fourth aspect, or for use in a system according to the first aspect, or in an assembly according to second aspect, or in an apparatus according to the third aspect, or for use in combination with a capsule in accordance with the sixth aspect, the brew chamber adapter comprising an external shape that corresponds with an internal shape of the first brew chamber for cooperating therewith, and wherein the brew chamber adapter comprises an internal shape that corresponds with an external shape of a sixth capsule for use in combination with the brew chamber adapter, for enabling the sixth capsule to be inserted in the first brew chamber part. As may be appreciated, using an adapter in accordance with this seventh aspect enables to use the system of the present invention to be useable in combination with a large variety of capsules of various shapes.

Yet further, in accordance with an eighth aspect, there is provided a capsule complementary brew chamber adapter, for use in a method according to the fifth aspect, or for use in a set of capsules according to the fourth aspect, or for use in a system according to the first aspect, or in an assembly according to second aspect, or in an apparatus according to the third aspect, or for use in combination with a capsule in accordance with the sixth aspect, the capsule complementary brew chamber adapter being suitable for use in combination with a first or second capsule, wherein the capsule complementary brew chamber adapter is shaped such as to fill or close the first volume when the brew chamber holds the first exchangeable capsule; or wherein the capsule complementary brew chamber adapter is shaped such as to fill or close the second volume when the brew chamber holds the second exchangeable capsule. A complementary brew chamber adapter according to this aspect provides the advantage of enabling the amount of waste water produced during brewing to be further reduced.

It will be appreciated that any of the embodiments, aspects, features and options described in view of the system apply equally to the apparatus, capsules and method. It will also be clear that any one or more of the above embodiments, aspects, features and options can be combined.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIGS. 2A and 2B illustrate a perspective and partly translucent view, respectively, of a lever mechanism for closing a brew chamber;

FIGS. 7A and 7B illustrate how a first brew chamber part may swivel downwardly to promote ejection of the a capsule;

DETAILED DESCRIPTION

Figure 1A:
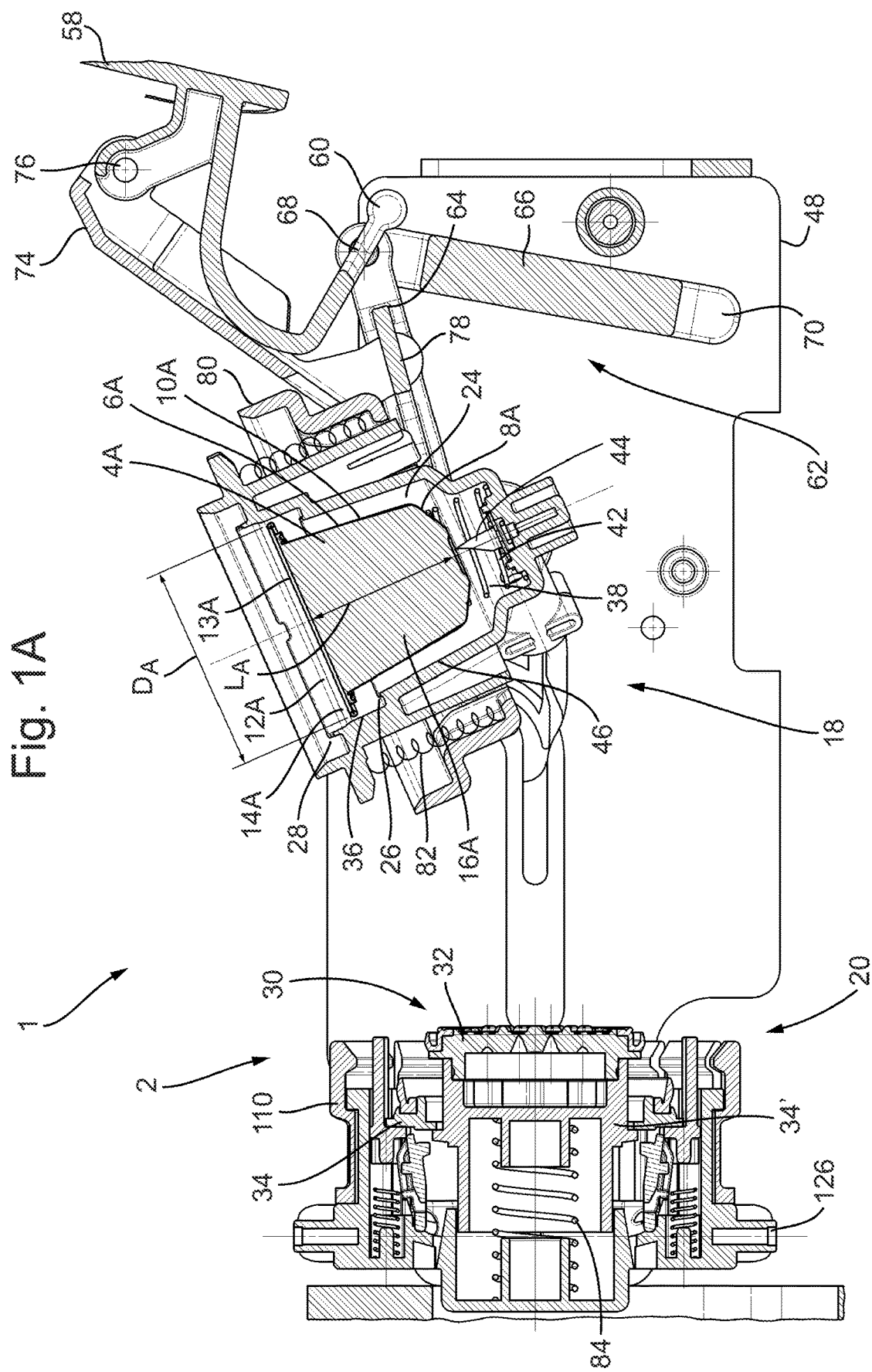
FIGS. 1A and 1B illustrate cross sectional views of a system for preparing a beverage.
Figure 1B:
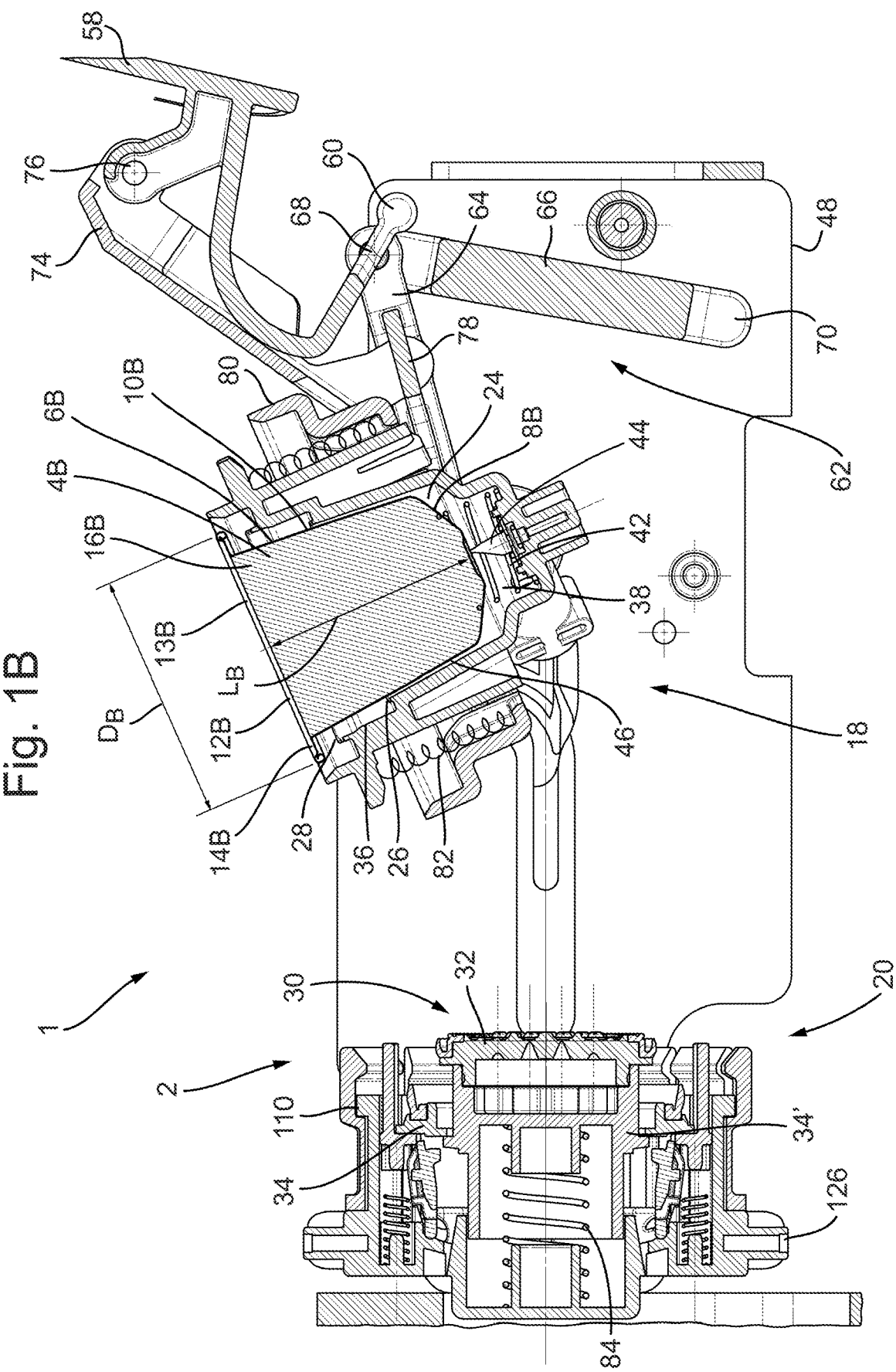

FIGS. 1A and 1B show schematic cross sectional views of a system 1 for preparing a beverage. The system includes an apparatus 2 and an exchangeable capsule. Here the system 1 is arranged for cooperating with a first capsule 4A and a second capsule 4B. The apparatus 2 shown in FIGS. 1A and 1B is one and the same apparatus. The apparatus 2 is arranged for selectively cooperating with either the first capsule 4A (see FIG. 1A) or the second capsule 4B (see FIG. 1B). It will be appreciated that the system 1 can include the apparatus 2, the first capsule 4A and the second capsule 4B.

The first and second capsules 4A, 4B are of a different type. In this example, the second capsule 4B is larger than the first capsule 4A. An axial length $L_B$ of the second capsule 4B is larger than an axial length $L_A$ of the first capsule 4A. A diameter $D_B$ of the second capsule 4B is a larger than a diameter $D_A$ of the first capsule 4A. Notwithstanding the differences, in this example the first and second capsules 4A, 4B are designed to make a similar visual impression. The first and second capsules 4A, 4B are designed to have a family look and feel. Here a ratio of the axial length and diameter $L_A/D_A$ of the first capsule 4A is substantially the same as a ratio of the axial length and diameter $L_B/D_B$ of the second capsule 4B. Preferably, the length to diameter ratio of the first and second capsules is identical within 20%, preferably within 10%, e.g. identical.

In view of the similarity, both capsules 4A, 4B will now be described simultaneously. In this example, the capsules 4A, 4B both include a cup-shaped body 6A, 6B. Here the cup-shaped body 6A, 6B includes a bottom 8A 8B and a circumferential wall 10A, 10B. The circumferential wall 10A, 10B here are slanted, under an angle with respect to the axial direction through the capsules 4A, 4B. For example, the angle of the slanted walls 10A, 10B may be the same for both capsules 4A, 4B. The slanted circumferential walls 10A, 10B provide a gradually decreasing cross section in a direction towards the bottom 8A, 8B of the capsules. The bottom 8A, 8B and the circumferential wall 10A, 10B can form a monolithic part. The capsules 4A, 4B both include a lid 12A, 12B. The lid 12A, 12B closes off an open end of the cup-shaped body 6A, 6B. The lid 12A, 12B includes an exit area 13A, 13B through which beverage can be drained from the capsule as explained below. In this example the lid 12A, 12B is connected to a flange-like rim 14A, 14B of the capsule 4A, 4B. Here the rim 14A, 14B is an outwardly extending rim. The bottom 8A, 8B, the circumferential wall 10A, 10B and the rim 14A, 14B can form a monolithic part. Here the exit area 13A, 13B defines the area of the lid 12A, 12B through which the beverage can potentially exit the capsule 4A, 4B. Hence, an area of the lid 12A, 12B sealed to the rim 14A, 14B does not constitute part of the exit area 13A, 13B. In this example, the capsules 4A, 4B are substantially rotation symmetric around an axis extending from the bottom 8A, 8B to the lid 12A, 12B. The cup-shaped body 6A, 6B and the lid 12A, 12B enclose an inner space 16A, 16B of the capsule. The inner space 16A, 16B includes a quantity of beverage ingredient, such as an extractable or soluble substance. The beverage ingredient can e.g. be roast and ground coffee, tea, or the like. The beverage ingredient can be powdered coffee. The beverage ingredient can be a liquid. In view of the difference in size of the capsules 4A, 4B it will be appreciated that the second capsule 4B can include a larger quantity of beverage ingredient than the first capsule 4A. In this example, the inner space 16B of the second capsule 4B is about twice the inner space 16A of the first capsule 4A. For example, the first capsule 4A may include 4-8 grams, e.g. about 6 grams, of ground coffee. For example, the second capsule 4B may include 8-16 grams, e.g. about 12 grams, of ground coffee.

The cup-shaped body 6A, 6B can be manufactured from a metal foil, such as aluminum foil, a plastics material, such as polypropylene or polyethylene, or a combination thereof. The cup-shaped body 6A, 6B can be manufactured by pressing, deep-drawing, vacuum forming, injection moulding or the like. The lid can be manufactured from a metal foil, such as aluminum foil, a plastics material, such as polypropylene or polyethylene, or a combination thereof. In the example the capsules 4A, 4B are so-called closed capsules. This indicates capsules that are hermetically closed prior to insertion into the apparatus. The closed capsules can be opened by the apparatus as described below.

The apparatus includes a first brew chamber part 18 and a second brew chamber part 20. The first and second brew chamber parts 18, 20 can be closed against each other to form a brew chamber 22A, 22B (not shown in FIGS. 1A, 1B).

The first brew chamber part 18 includes a cavity 24. The cavity 24 is arranged for receiving the first or second capsule 4A, 4B. Here the cavity 24 of the first brew chamber part 18 is a predetermined cavity 24 arranged for holding the first or second capsule 4A, 4B. Here the cavity 24 has an invariable shape for holding the first or second capsule 4A, 4B. Here the first brew chamber part 18 is arranged for holding the first or second capsule 4A, 4B without changing a configuration of the first brew chamber part 18. In this example the first brew chamber part 18 is a monolithic part. In this example the first brew chamber part 18 includes a first abutment surface 26. The first abutment surface is positioned inside the cavity 24. The first annular abutment surface 26 is formed in the peripheral wall forming the inner surface 46 of the first brew chamber part 18, defining the cavity 24. Here the first abutment surface 26 is a first generally annular abutment surface. The first generally annular abutment surface 26 can be continuously annular, or it may be interrupted annular, such as comprising a plurality of segments along an annulus. The first abutment surface 26 may for example take the shape of one or more, e.g. arched, ridges which protrude into cavity 22. Here the first abutment surface 26 provides the cavity 22 with a stepped shape. In this example the first brew chamber part 18 includes a second abutment surface 28. The second abutment surface is positioned near the open end of the cavity 24. Here the second abutment surface 28 is a second generally annular abutment surface. The second generally annular abutment surface 28 can be continuously annular, or it may be interrupted annular, such as comprising a plurality of segments along an annulus. The second abutment surface 28 may for example take the shape of one or more, e.g. arched, ridges. It will be appreciated that the first abutment surface 26 and the second abutment surface 28 are spaced at a mutual distance in an axial direction of the first brew chamber part 18. The first abutment surface 26 and the second abutment surface are positioned at a fixed spacing. The first abutment surface 26 and the second abutment surface are immobile relative to each other. Here, the first brew chamber part 18 includes an ejector 38. The ejector 38 may include a conical ring and/or a resilient element 42, here a helical spring. The first brew chamber part 18 includes piercing means 44 for piercing the bottom of the capsule. Here the piercing means includes a plurality of knives, such as three knives.

The second brew chamber part 20 includes an extraction plate 30. In this example, the extraction plate 30 includes a central portion 32 and a peripheral portion 34. The central portion 32 is movable relative to the peripheral portion 34. Here the central portion 32 is movable in an axial direction of the second brew chamber part 20.

The system 1 as described thus far can be used for preparing a beverage as follows. Further features of the system 1 will be explained along the way.

In the example of FIGS. 1A and 1B the apparatus 2 is in a state ready for receiving a capsule. In FIGS. 1A and 1B the capsule 4A, 4B has just been inserted into the cavity of the first brew chamber part 18. The first brew chamber part 18 is in an inclined position. The open end of the cavity 24 points upwards.

As shown in FIG. 1A, the first capsule 4A can fall into the cavity 24 under the influence of gravity. Herein the rim 14A of the first capsule 4A is guided by an inner surface 36 of the first brew chamber part 18. The bottom 8A of the first capsule 4A lowers into the cavity 24 until it abuts against the ejector 38. Here the bottom 8A of the first capsule 4A centers on the ejector 38. It will be appreciated that the rim 14A of the first capsule 4A is positioned between the first abutment surface 26 and the second abutment surface 28. The bottom 8A of the first capsule 4A is not yet pierced in this state.

As shown in FIG. 1B, the second capsule 4B can also fall into the cavity 24 under the influence of gravity. Herein the circumferential wall 10B of the second capsule 4B is guided by an inner surface 46 of the first brew chamber part 18. The bottom 8B of the second capsule 4B lowers into the cavity 24 until it abuts against the ejector 38. Here the bottom 8B of the second capsule 4B centers on the ejector 38. It will be appreciated that the rim 14B of the second capsule 4B is positioned beyond the second abutment surface 28 when seen from the piercing means 44. The bottom 8B of the second capsule 4B is not yet pierced in this state.

Once the capsule 4A, 4B is inserted into the cavity 24 as shown in FIGS. 1A and 1B, the first brew chamber part 18 can be moved towards the second brew chamber part 20 for closing the brew chamber around the capsule 4A, 4B. The first brew chamber part 18 is guided in a frame 48 of the apparatus.

Figure 2A:
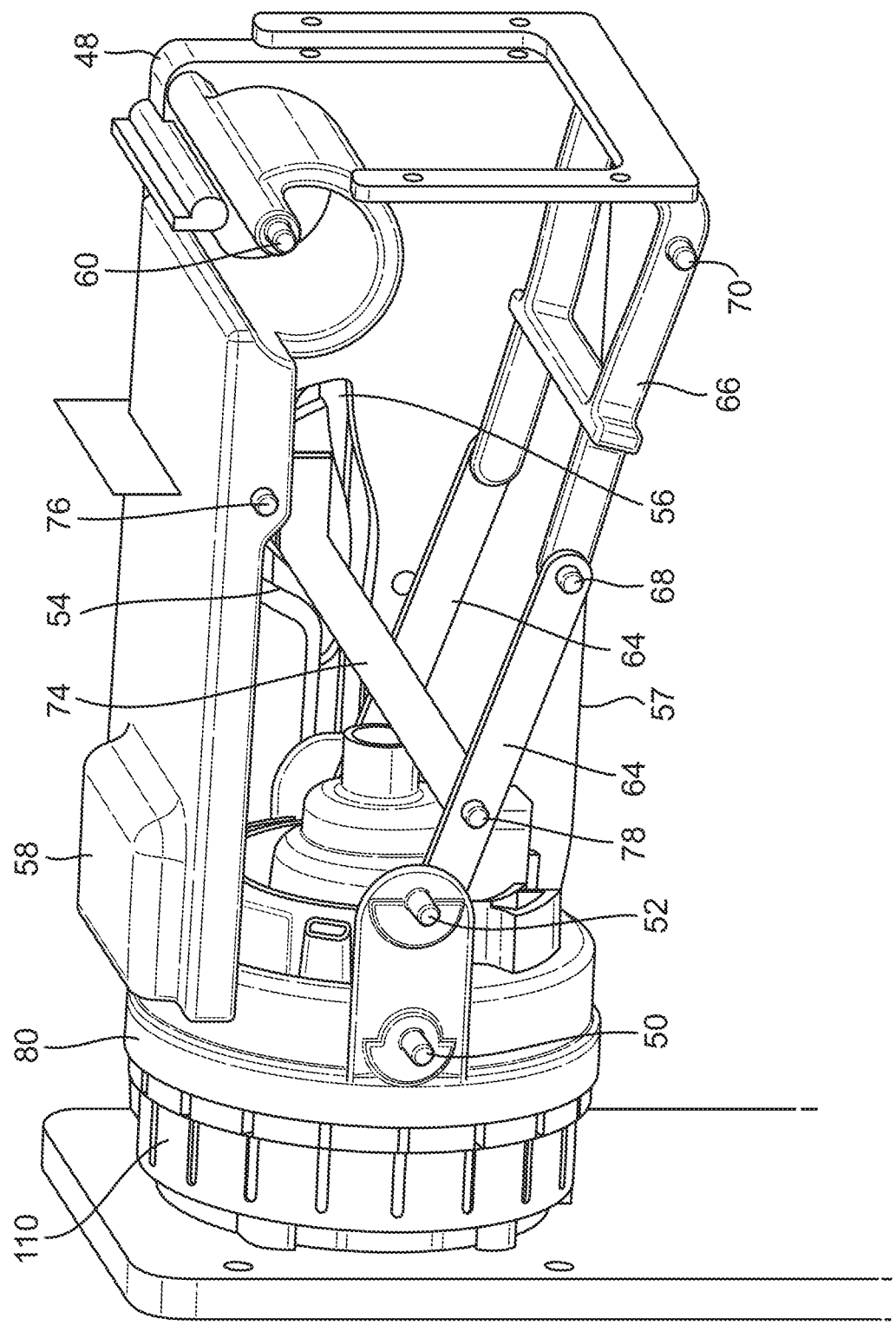

In this example the first brew chamber part 18 includes first bosses 50 and second bosses 52 as shown in FIGS. 2A and 2B. The first bosses 50 are guided in a first groove 54 of the frame 48. The second bosses 52 are guided in a second groove 56 of the frame 48. It will be appreciated that the bosses 50, 52 and grooves 54, 56 determine the path that will be followed by the first brew chamber part 18. Here the first groove 54 and the second groove 56 are provided in a side wall 57 of the frame 48. The first groove 54 extends into the side wall 57 to a first depth. The second groove 56 extends into the side wall to a second depth. The second depth is larger than the first depth. The first boss 50 has a larger diameter than the second boss 52. The first groove 54 has a larger width than the second groove 56. The width of the first groove 54 corresponds to the diameter of the first boss 50. The width of the second groove 56 corresponds to the width of the second boss 52. It will be appreciated that the first groove 54 extends along a different trajectory than the second groove 56. The different widths and depths of the grooves allow the first and second bosses 50, 52 to follow different trajectories. This construction allows a very compact construction for guiding the first and second bosses 50, 52.

The apparatus 2 includes a lever 58. The lever can be actuated manually by a user. The lever is pivotally connected to the frame 48 around a lever axis 60. The first brew chamber part 18 is connected to the frame 48 via a knee joint 62. The knee joint 62 includes a push rod 64 and a crank 66. The push rod 64 is pivotally connected to the crank 66 at a knee axis 68. The crank 66 is pivotally connected to the frame 48 at a crank axis 70. The lever 58 is connected to the knee joint 62 for actuating the first brew chamber part 18 in motion. Here the lever 58 is connected to the knee joint 62 through a lever link 74. The lever link 74 is pivotally connected to the lever 58 at a lever link axis 76. The lever link 74 is pivotally connected to the push rod 74 at a knee link axis 78.

An arresting ring 80 is arranged surrounding the first brew chamber part 18. The arresting ring 80 is axially movable relative to the first brew chamber part 18. Here, the arresting ring 80 is guided by an external surface of the first brew chamber part 18. The arresting ring is connected to the first brew chamber part via one or more resilient elements 82, here helical springs. The push rod is pivotally connected to the arresting ring 80 at a push rod axis 72. Hence, here the knee joint 62 is indirectly connected to the first brew chamber part 18, viz. via the arresting ring 80 and one or more resilient elements 82. The function of the arresting ring will be set out below.

When the lever 58 is moved in a downward direction the knee joint 62 will push the first brew chamber part 18 towards the second brew chamber part 20. Simultaneously, due to the shape of the first and second grooves 54, 56, the first brew chamber part 18 will be rotated from the upwards inclined orientation into a an aligned orientation in which an axial direction of the first brew chamber part 18 is aligned with an axial direction of the second brew chamber part 20.

As mentioned above, the apparatus 2 is arranged for selectively cooperating with either the first capsule 4A or the second capsule 4B. Here, the system 1 is arranged for automatically adjusting the brew chamber depending on whether the first or the second capsule has been inserted. This provides the advantage that no user input is required for selecting proper handling of the first or second capsule. Hence, the risk of errors is greatly reduced.

As mentioned, the second brew chamber part 20 includes an extraction plate 30 with a central portion 32 and a peripheral portion 34. Here the central portion 32 is movable in an axial direction of the second brew chamber part 20. The central portion 32 in this example includes a shaft 32' axially slidably movable with respect to the frame 48. The central portion 32 is connected to the frame 48 via a resilient member 84, here a helical spring. The resilient member 84 biases the central portion into a ready position in FIGS. 1A and 1B. The ready position is an extended position in this example. The central portion 32 can be positioned in a first brewing position for cooperating with the first capsule 4A. The central portion can be positioned in a second brewing position for cooperating with the second capsule 4B. In this example, the system 1 includes a locking mechanism 86 arranged for locking the central portion 32 in or near the first brewing position when the cavity 24 holds the first capsule 4A.

The locking mechanism 86 includes a locker 88. Here the locker 88 is designed as a pivotable finger, pivotable around a pivoting axis 90. The locker 88 is biased into a position pivoted away from the shaft 32'. The locker could also be biased into any other suitable position. The locking mechanism 86 further includes a pusher 92. The pusher is slidably guided in a body 94 of the second brew part 20. The pusher 92 is connected to the body 94 via a resilient member 96, here a helical spring. The resilient member 96 biases the pusher in an extended position. The first brew chamber part 18 includes an actuator 98. Here the actuator is formed by a frontal surface of the first brew chamber part 18.

Figure 3A:
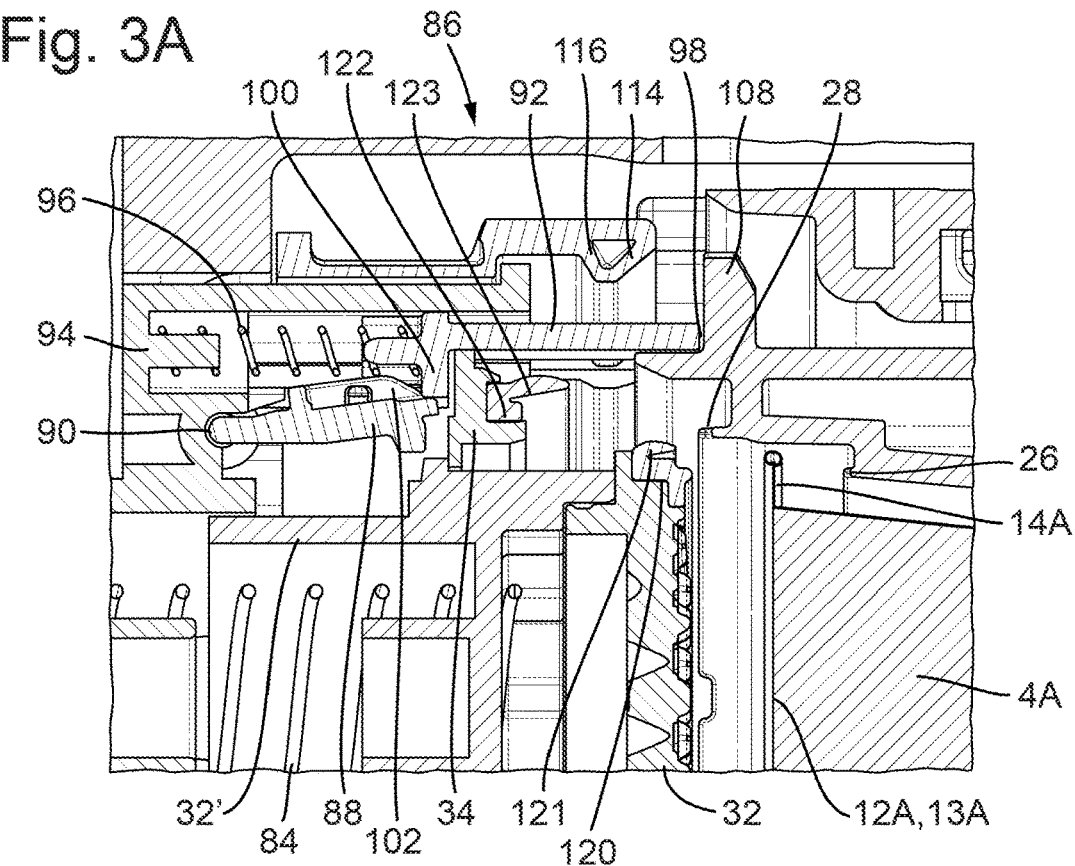
FIGS. 3A and 3B illustrate cross sectional views of the functioning of a locking mechanism when a first capsule is inserted.
Figure 3B:
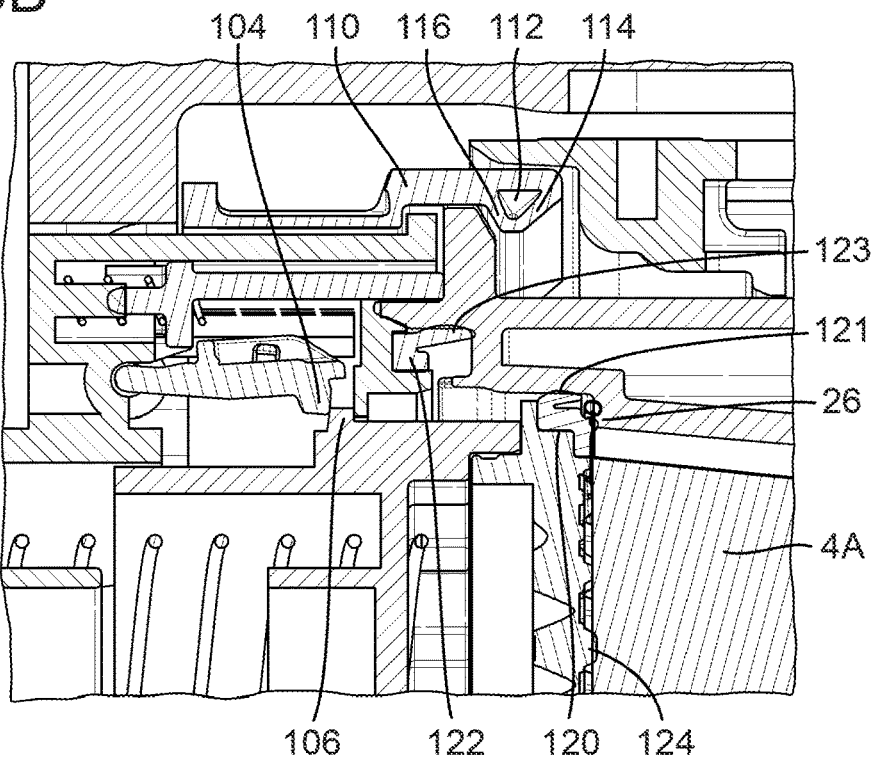

FIGS. 3A and 3B show functioning of the locking mechanism 86 when the cavity 24 holds the first capsule 4A. In this example, an outermost part of the first capsule 4A, here formed by the lid 12A, exit area 13A and/or rim 14A, is positioned rearwardly, i.e. more towards the piercing means 44, relative to the actuator 98. As a result, when advancing the first capsule 4A towards the second brew chamber part 20, the actuator 98 will touch the pusher 92 before the outermost part of the first capsule 4A will touch the central portion 32. The pusher is pushed against the biasing force of the resilient member 96. A lip 100 of the pusher 92 will slide along a sloping surface 102 of the locker 88, causing the locker 88 to pivot towards the shaft 32'. As a result, a thumb 104 of the locker 88 is placed in a path of movement of part 106 of the central portion 32 (see FIG. 3B). When the first capsule 4A is advanced further towards the second brew chamber part 20 the first capsule 4A will abut against the central portion 32. This can cause the central portion to be pushed against the biasing force of the resilient member 84. The pivoted locker 88 prevents travel of the central portion beyond a position where the part 106 abuts against the thumb 104. This is herein defined as the first brewing position. Hence, the first capsule 4A is arranged for moving the central portion 32 from the ready position to the first brewing position. The first capsule 4A is held between the first and second brew chamber parts 18, 20 while brewing, wherein the central portion 32 is in the first brewing position.

Figure 4A:
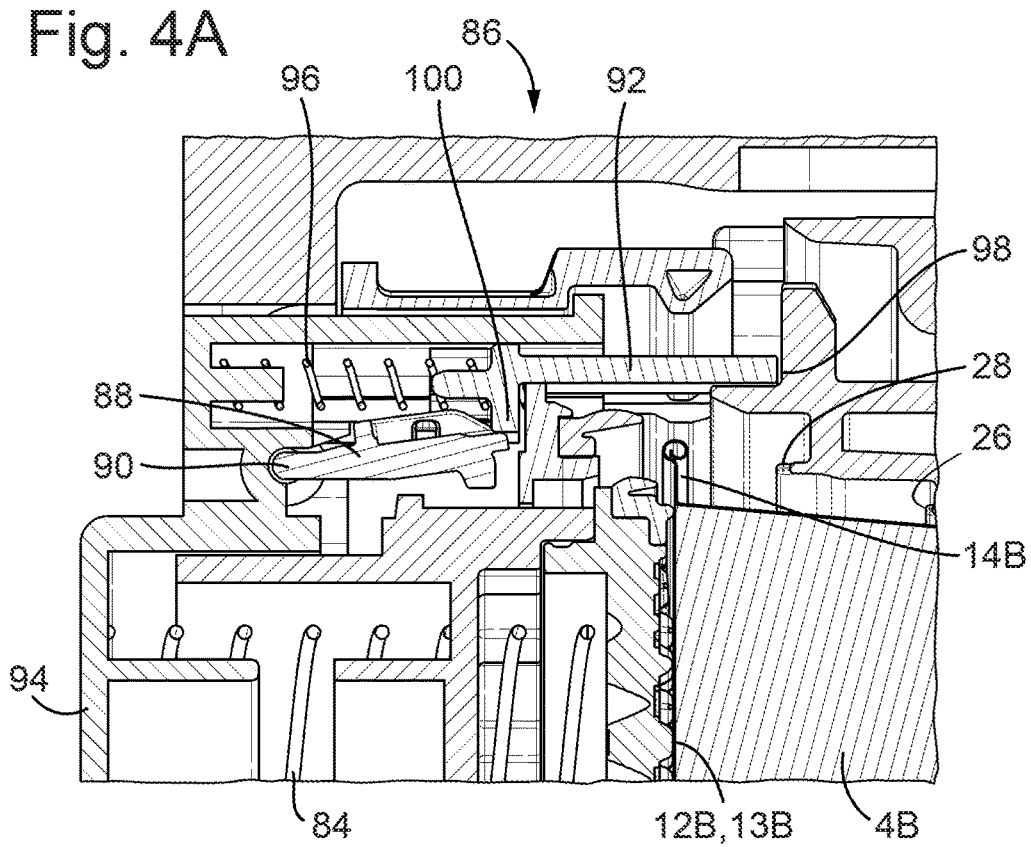
FIGS. 4A and 4B illustrate cross sectional views of the functioning of a locking mechanism when a second capsule is inserted.
Figure 4B:
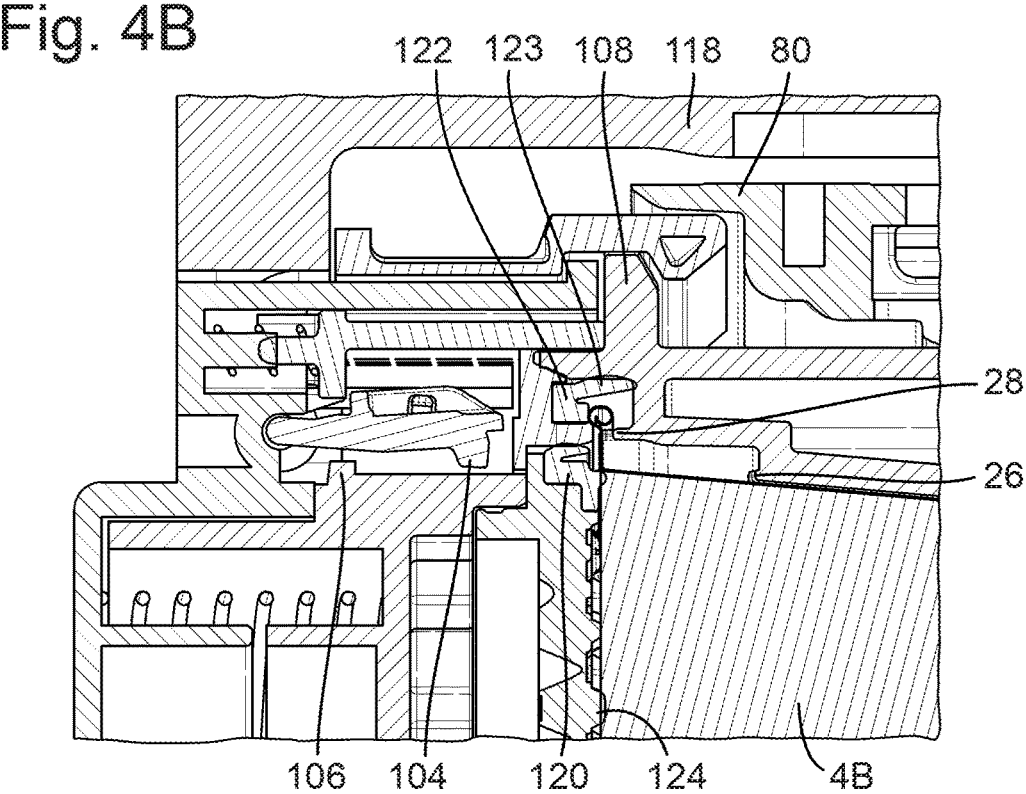

FIGS. 4A and 4B show functioning of the locking mechanism 86 when the cavity 24 holds the second capsule 4B. In this example, an outermost part of the second capsule 4B, here formed by the lid 12B, exit area 13B and/or rim 14B, is positioned forwardly, i.e. more towards the second brew chamber part 20, relative to the actuator 98. As a result, when advancing the second capsule 4B towards the second brew chamber part 20, the outermost part of the second capsule 4B will abut against the central portion 32 before the actuator 98 will touch the pusher 92. The central portion 32 is pushed against the biasing force of the resilient member 84 while the locker 88 is still pivoted away from the shaft 32'. As a result, the part 106 passed underneath the thumb 104. Only after the part 106 has passed the thumb 104 the pusher is pushed against the biasing force of the resilient member 96 by the actuator 98. The lip 100 of the pusher 92 will still slide along the sloping surface 102 of the locker 88, causing the locker 88 to pivot towards the shaft 32'. However, the part 106 has already passed the thumb 104 at that moment. In this example, the second capsule 4B pushes the central portion 32 in abutment with the body 94. This is herein defined as the second brewing position. Hence, the second capsule 4B is arranged for moving the central portion 32 from the ready position to the second brewing position. The second capsule 4B is held between the first and second brew chamber parts 18, 20 while brewing, wherein the central portion 32 is in the second brewing position.

Thus, the locking mechanism 86 is arranged for locking the central portion 32 in the first extraction position when the cavity 24 holds the first capsule 4A. It is noted that the locking may be single-sided, viz. the locking mechanism may prevent the central portion 32 from being moved beyond the first extraction position when the cavity 24 holds the first capsule 4A. However movement of the central portion 32 from the first extraction position to the ready position may be not prevented. The locking unit 86 is arranged for selectively preventing the central portion 32 being locked in or near the first brewing position when the second capsule 4B is included in the brew chamber. The locking unit 86 is arranged for selectively allowing the central portion 32 being moved into the second brewing position when the second capsule is included in the brew chamber.

When comparing FIGS. 3A and 4A it will be appreciated that while advancing the first brew chamber part 18 towards the second brew chamber part 20 the first capsule 4A is recessed further into the first brew chamber part than the second capsule 4B. Then the first lid 12A, exit area 13A and/or rim 14B is recessed further into the first brew chamber part 18 than the second lid 12B, exit area 13B and/or rim 14B.

When comparing FIGS. 3B and 4B it will be appreciated that when the brew chamber holds the first capsule 4A, the central portion 32 extends into the cavity 24. The central portion 32 extends into the first brew chamber part 18 beyond a position where the lid 12B, exit area 13B and/or rim 14B of the second capsule 4B would have been, had the second capsule been included in the first brew chamber part 18.

Figure 5A:
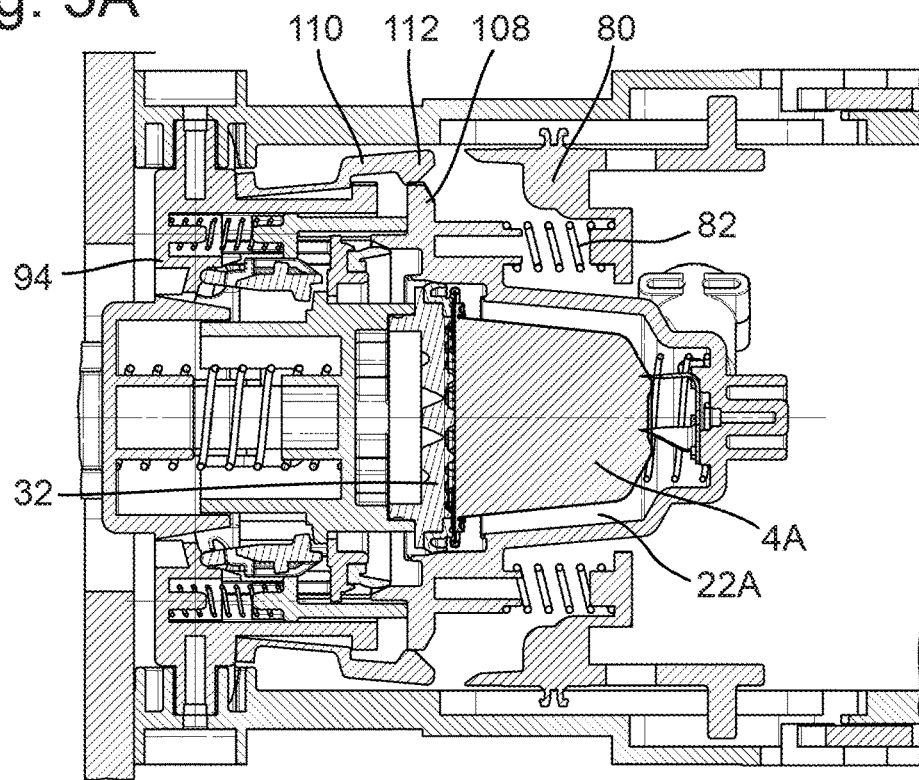
FIGS. 5A-5C illustrate functioning of an arresting ring.
Figure 5B:
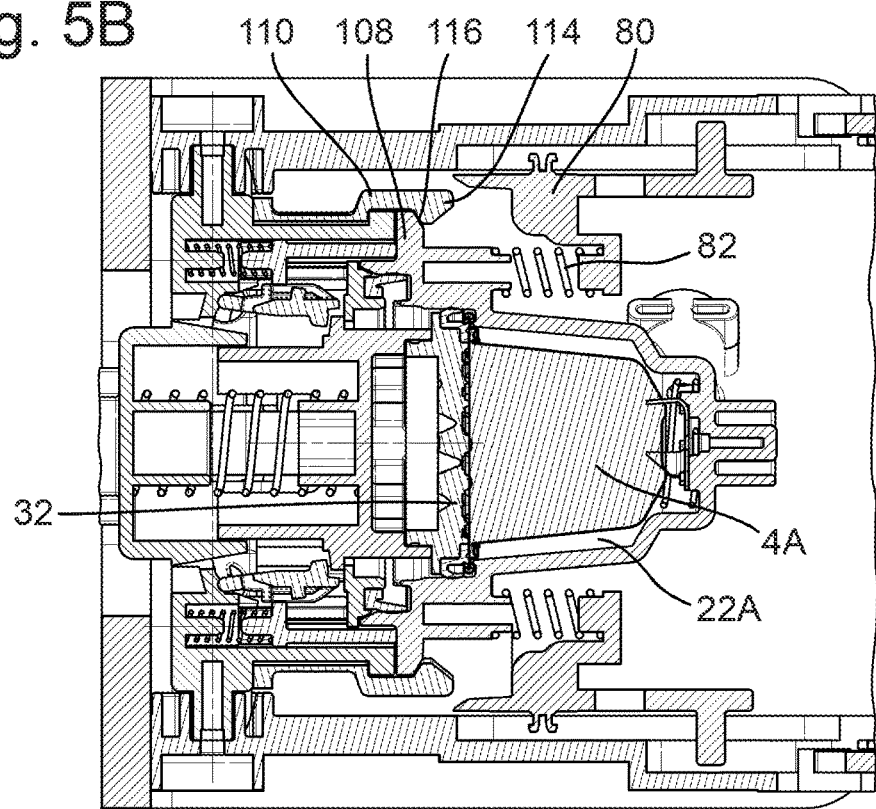
Figure 5C:
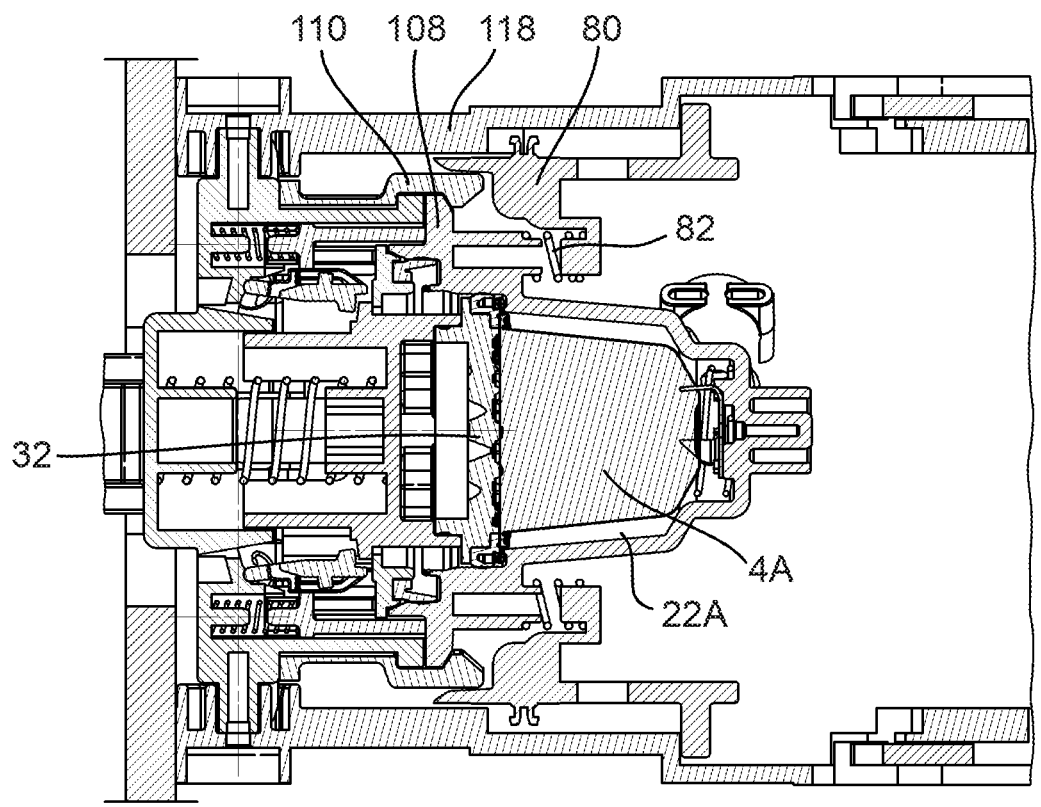

As mentioned above, the knee joint 62 is indirectly connected to the first brew chamber part 18, viz. via the arresting ring 80 and one or more resilient elements 82. FIGS. 5A-5C demonstrate functioning of the arresting ring 80.

In FIG. 5A the first capsule 4A abuts against the central portion 32 with the central portion in the first brewing position. The arresting ring 80 is still in the rearward position. It will be appreciated that the lever 58 will not yet have reached its end position. The first brew chamber part 18 includes a protrusion 108. Here the protrusion 108 is a substantially annular protrusion. The protrusion 108 extends outwardly. Here the protrusion 108 forms an outermost edge of the first brew chamber part 18. The second brew chamber part 20 includes a retainer 110. Here the retainer 110 is designed as a circumferential ring of retainer lips. The retainer 110 is pivotally connected to the body 94. Here the retainer 110 is resiliently pivotally connected to the body 94. The retainer 110 includes a tooth 112. The tooth here has a first inclined surface 114 and a second inclined surface 116.

When lowering the lever 58, the arresting ring 80 will be advanced towards the second brew chamber part 20. The one or more resilient elements 82 will push the first brew chamber part 18 ahead of the arresting ring 80 until the first brew chamber part abuts against the second brew chamber 20 part, e.g. with the capsule 4A, 4B clamped in between. During this movement, the protrusion 108 will advance against the first inclined surface 114. This causes the retainer 110 to be pivoted outwardly (see FIG. 5A). Further advancing causes the protrusion 108 to pass beyond the second inclined surface 116, causing the retainer 110 to pivot inwardly (see FIG. 5B). Further lowering of the lever 58 first brew chamber part abuts against the second brew chamber 20 part will cause the one or more resilient elements 82 to be compressed. As a result, the arresting ring 80 will advance towards the second brew chamber part 20. Fully lowering the lever 58 will cause the arresting ring 80 to be interposed between the retainer 110 and a locking ring 118 (see FIG. 5C). The arresting ring 80 surrounding the retainer 110 prevents the retainer 110 from pivoting outwardly. Hence, the first brew chamber part is locked with respect to the second brew chamber part 20. The first brew chamber part is locked onto the second brew chamber part 20.

The apparatus can include a fluid supply system for supplying a fluid, e.g. a liquid, such as hot water under pressure, to the first brew chamber part 18. When the brew chamber is pressurized with the fluid for brewing a beverage, the first and second brew chamber parts 18, 20 will be pushed away from each other by the fluid pressure. The retainer 110 and arresting ring 80, and optionally the locking ring 118, will bear all, or part of, the force exerted by the fluid pressure. The arresting ring 80 interposed between the retainer 110 and the locking ring 118 increases mechanical stability. The arresting ring 80 does not have to bear all forces exerted onto it by the retainer 110, since it can abut against the locking ring 118 and transmit at least part of the forces to the locking ring 118. The locking ring 118 can be immobile, and hence can easily be reinforced. Since the first brew chamber part is locked onto the second brew chamber part 20 the frame 48 and the actuation mechanism, e.g. the knee joint, do not have to bear this force, or at least a smaller part thereof. Hence the frame and/or the actuation mechanism can be designed weaker and/or cheaper.

Figure 6A:
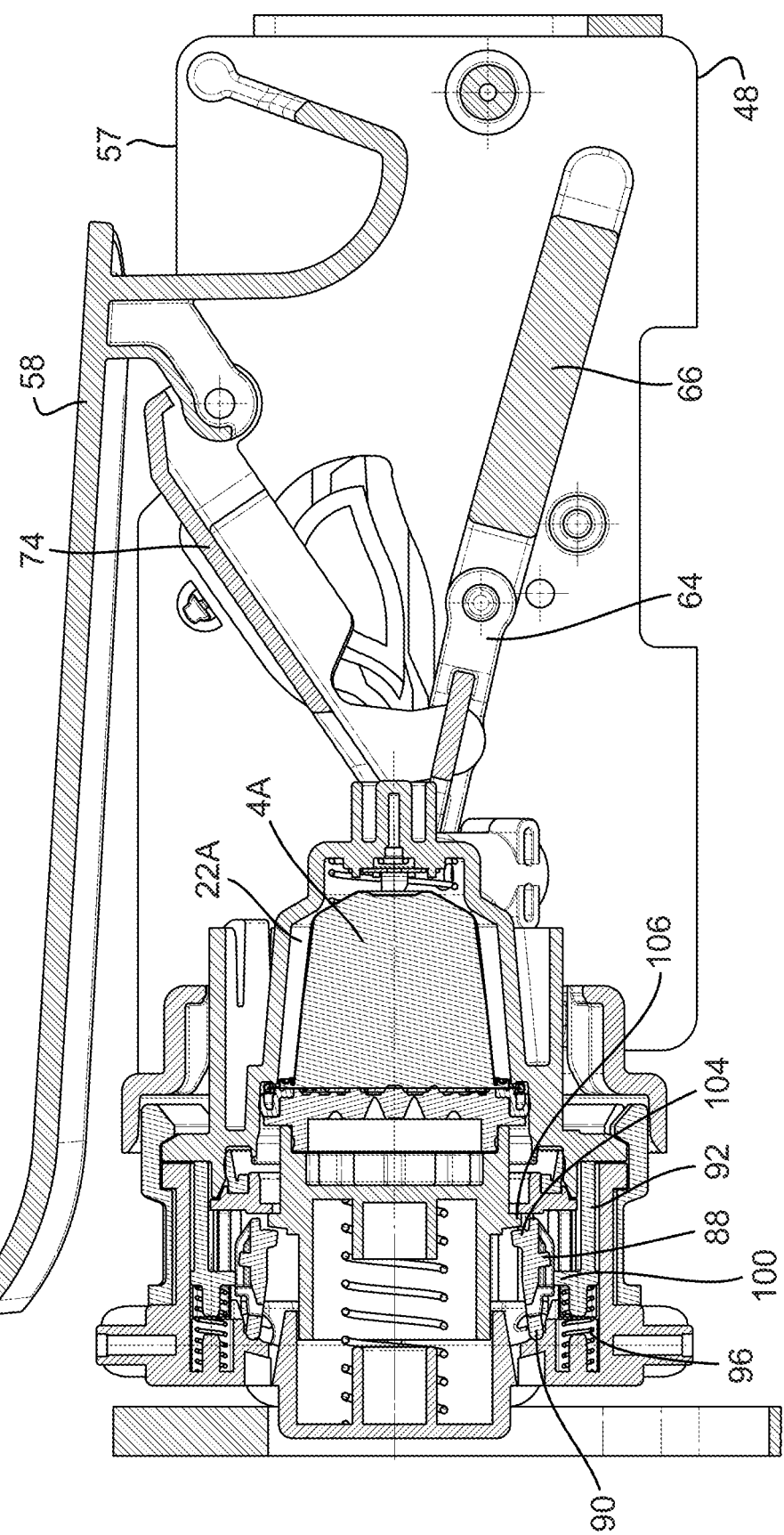
FIGS. 6A and 6B illustrate the presence of a first or second capsule in the brew chamber during extraction.
Figure 6B:
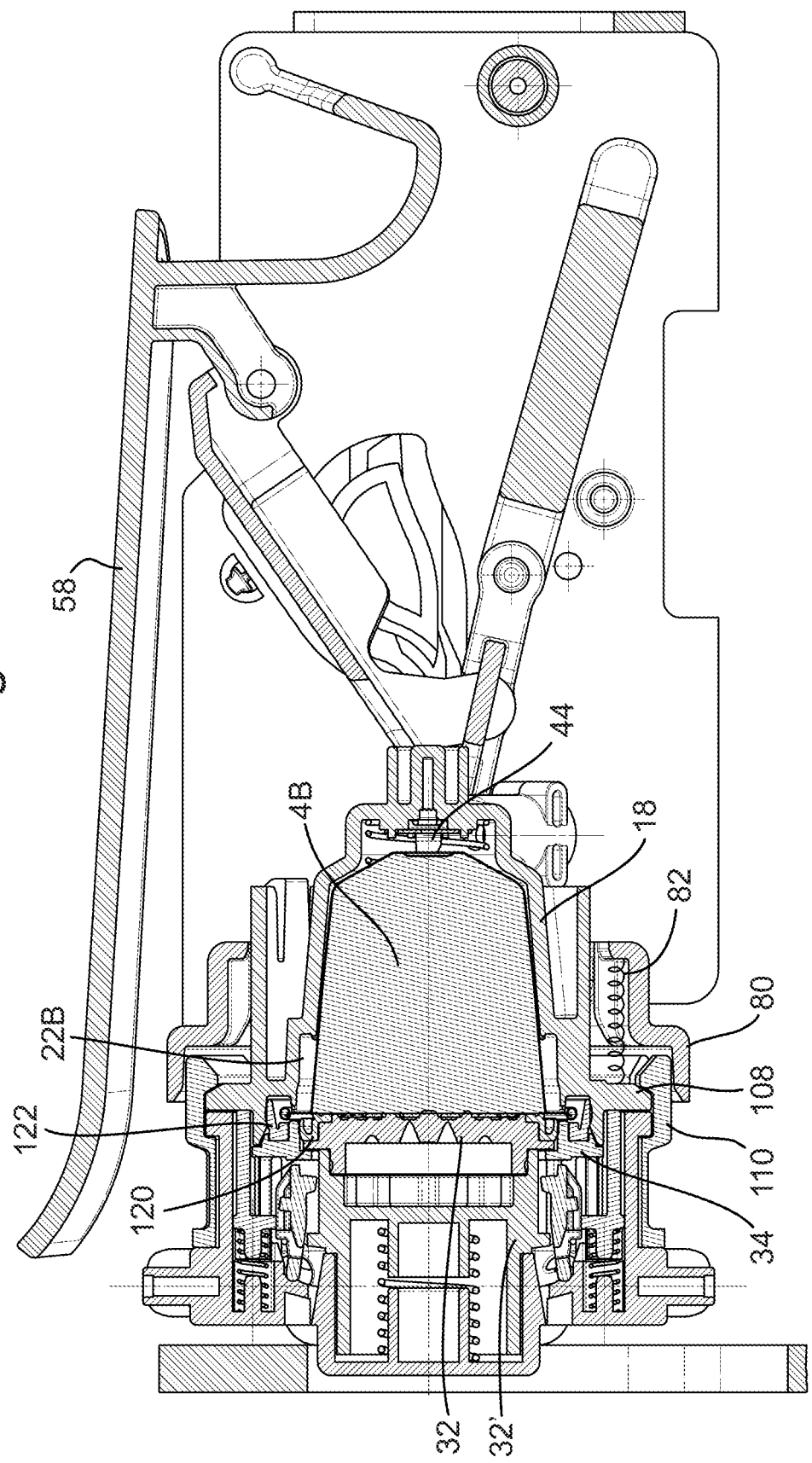

Although the functioning of the arresting ring 80 has been shown in FIGS. 5A-5C with respect to the first capsule 4A, it will be appreciated that the arresting ring 80 can function identically with respect to the second capsule 4B. FIG. 6A shows the first capsule 4A in the brew chamber during extraction. FIG. 6B shows the second capsule 4B in the brew chamber during extraction.

The piercing member 44 is arranged for piercing the bottom 8A, 8B of the capsule 4A, 4B. As can also be seen in FIGS. 5A-5C, in this example the piercing member 44 does not pierce the bottom 8A, 8B until the lid 12A, 12B of the capsule 4A, 4B abuts against the central portion 32 in the first or second brewing position. Thereto, stiffnesses of the resilient element 42 and the resilient member 84 can be chosen. In this example, the stiffness of the resilient element 42 is chosen to be larger than the stiffness of the resilient member 84. However, it will be appreciated that it is also possible that the stiffness of the resilient element 42 is equal to the stiffness of the resilient member 84 or that the stiffness of the resilient element 42 is smaller than the stiffness of the resilient member 84.

Once the capsule 4A, 4B is included in the brew chamber, and the bottom 8A, 8B has been pierced, a fluid, in this example hot water under pressure, can be supplied to the brew chamber. Therefore it is desired that the brew chamber is leak tight. Thereto the central portion 32 is provided with a first sealing member 120. The peripheral portion 34 is provided with a second sealing member 122. The beverage preparation apparatus 2 is arranged for preparing a quantity of a beverage, suitable for consumption, using either a first capsule 4A or a second capsule 4B. The quantity can be a predetermined quantity. The quantity can also be a user selectable, user settable, or user programmable quantity.

Referring to FIG. 3B sealing in view of the first capsule 4A is described. The first sealing member 120 is arranged for providing a fluid sealing engagement between the central portion 32 and the first brew chamber 18 part when forming the brew chamber for holding the first capsule 4A. In this example, the first sealing member 120 abuts against the first brew chamber part 18 when the first capsule 4A is included in the brew chamber. This provides a seal for water being present in the cavity 24 outside the capsule 4A. This way, brewing fluid injected into the brew chamber 22A is prevented from bypassing around the outside of the capsule 4A. In the example of FIG. 3B the first sealing member 120 includes a resilient lip 121. The resilient lip 121 is arranged to provide a self-reinforcing sealing engagement between the central portion 32 and the first brew chamber part 18 under the effect of fluid pressure in the brew chamber (which may for example be as high as 19 or 20 bar). In this example the first sealing member 120 abuts against the rim 14A of the first capsule 4A. The rim 14A is pressed against the first sealing member 120 by the first abutment surface 26. This provides a sealing engagement between the central portion 32 and the capsule 4A against beverage exiting the capsule 4A via the exit area 13A. It will be appreciated that here the side of the rim 14A facing away from the cup-shaped body 6A is sealed against the second brew chamber part 20. Alternatively, or additionally, the side of the rim 14A facing towards the cup-shaped body 6A can be sealed against the first brew chamber part 18. Thereto an additional seal can be provided on the first brew chamber part 18, e.g. on the first abutment surface 26, and/or on the capsule 4A, e.g. on the rim 14A. It will be clear that a seal on the capsule may be additional to the seal between the first brew chamber part 18 and the second brew chamber part 20. This may reduce the sealing effort by the first sealing member 120.

Referring to FIG. 4B sealing in view of the second capsule 4B is described. The second sealing member 122 is arranged for providing a fluid sealing engagement between the peripheral portion 34 and the first brew chamber 18 part when forming the brew chamber for holding the second capsule 4B. In this example, the second sealing member 122 abuts against the first brew chamber part 18 when the second capsule 4B is included in the brew chamber. This provides a seal for water being present in the cavity 24 outside the capsule 4B. In the example of FIG. 4B the second sealing member 122 includes a resilient lip 123. The resilient lip 123 is arranged to provide a self-reinforcing sealing engagement between the peripheral portion 34 and the first brew chamber part 18 under the effect of fluid pressure in the brew chamber. In this example the second sealing member 122 abuts against the rim 14B of the second capsule 4B. The rim 14B is pressed against the second sealing member 122 by the second abutment surface 28. This may provide a sealing engagement between the peripheral portion 34 and the capsule 4B against beverage exiting the capsule 4B via the exit area 13B. In FIG. 4B the first sealing member 120 provides a sealing engagement between the central portion 32 and the peripheral portion 34 when forming the brew chamber for holding the second capsule 4B. This sealing engagement between the central portion 32 and the peripheral portion 34 can be self-reinforcing. Thereto the engagement between peripheral portion 34 and the second capsule 4B may allow brewing fluid to pass to the first sealing member 120. Hence, the first sealing member 120 provides a sealing engagement between the central portion 32 and the capsule 4B against beverage exiting the capsule 4B via the exit area 13B. It will be appreciated that here the side of the rim 14B facing away from the cup-shaped body 6B, which rim may or may not be covered by a lid, for example by a foil, is sealed against the second brew chamber part 20. Alternatively, or additionally, the side of the rim 14B facing towards the cup-shaped body 6B can be sealed against the first brew chamber part 18. Thereto an additional seal can be provided on the first brew chamber part 18, e.g. on the second abutment surface 28, and/or on the capsule 4B, e.g. on the rim 14B. It will be clear that a seal on the capsule may be additional to the seal between the first brew chamber part 18 and the second brew chamber part 20. This may reduce the sealing effort by the second sealing member 122.

Additionally or alternatively, the first sealing member can include a resilient lip arranged to provide a self-reinforcing sealing engagement between the central portion and the peripheral portion when forming the brew chamber for holding the second exchangeable capsule. The second sealing member may then for example leak some liquid, for example water, to inflate said resilient lip of the first sealing member.

When the fluid under pressure is supplied to the capsule 4A, 4B in the brew chamber, the exit area 13A, 13B may open against the extraction plate 30. The extraction plate 30 in this example includes a plurality of relief elements 124. Here the relief elements 124 are truncated pyramids. A rise in pressure inside the capsule 4A, 4B can cause the exit area 13A, 13B to tear against the relief elements allowing beverage to exit the capsule 4A, 4B.

The beverage can pass through the extraction plate 30 via apertures in the extraction plate. Next the beverage can flow to an outlet 126. From the outlet 126 the beverage can flow into a receptacle, such as a cup.

Figure 7B:
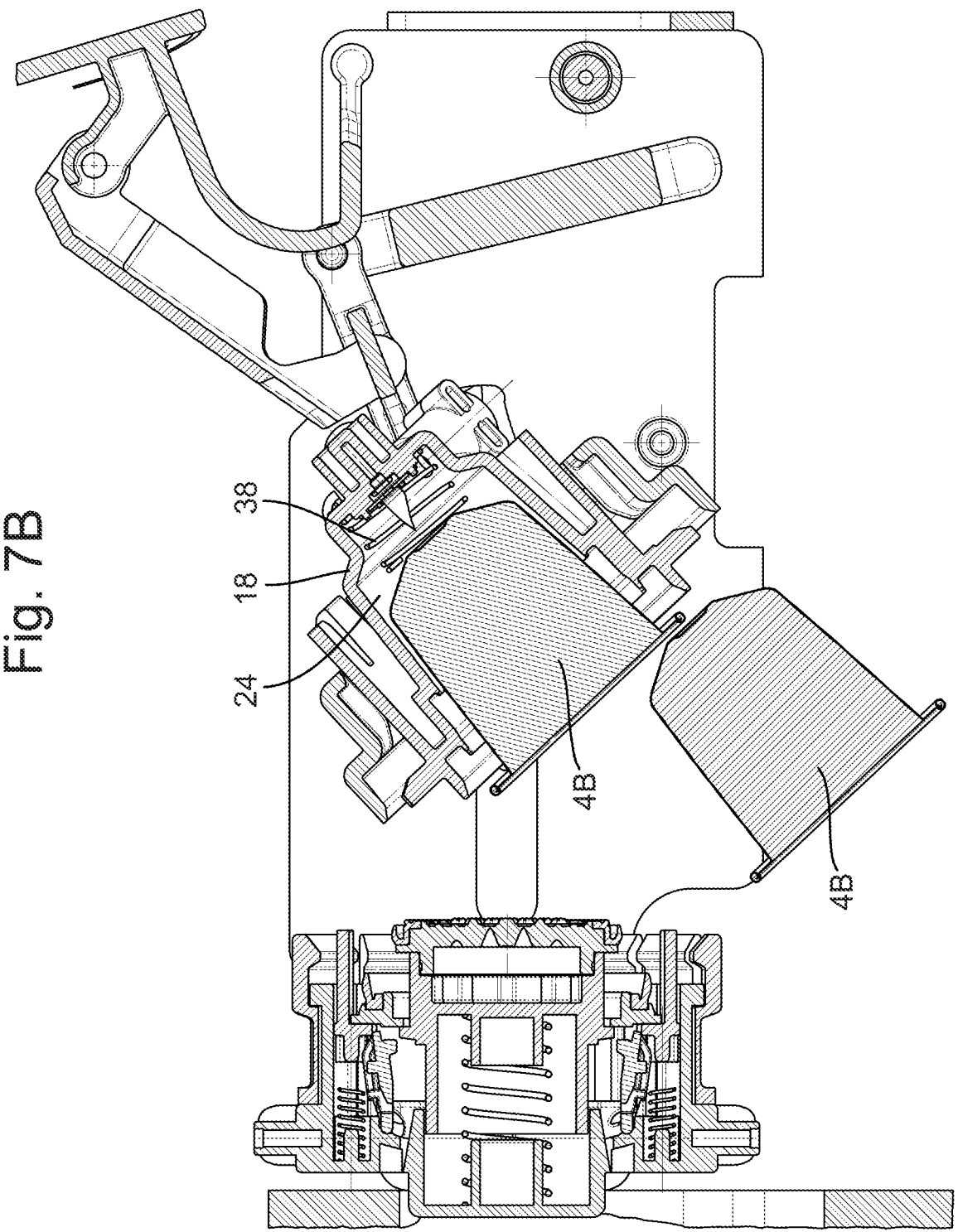

Once the beverage has been brewed, the lever 58 can be moved upwardly. This causes the arresting ring 80 to be moved away from the retainer 110. Next, the first brew chamber part 18 will be moved rearwardly. The second inclined surface 116 of the retainer 110 can allow the retainer to pass the projection 108. The first brew chamber 18 part will move away from the second brew chamber part 20. The central portion 32 will return to the ready position. The bosses 50, 52 and grooves 54, 56 determine the path that will be followed by the first brew chamber part 18. As shown in FIGS. 7A and 7B the first brew chamber part will swivel downwardly. This promotes ejection of the used capsule 4A, 4B from the cavity 24 under the effect of gravity. The ejector 38 can assist in pushing the capsule 4A, 4B off the piercing member 44 and out of the cavity 24. The used capsule 4A, 4B can fall into a waste basket of the apparatus 2.

Figure 8A:
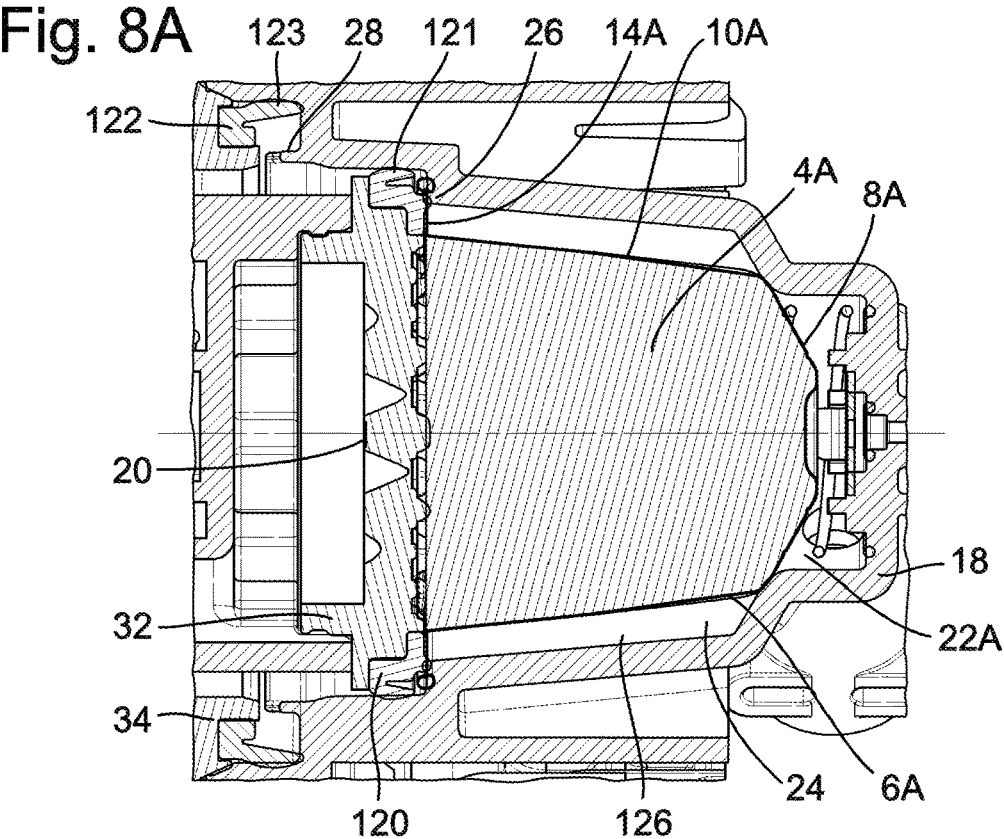
FIGS. 8A and 8B illustrate a first or second capsule, respectively, inserted in the brew chamber.
Figure 8B:
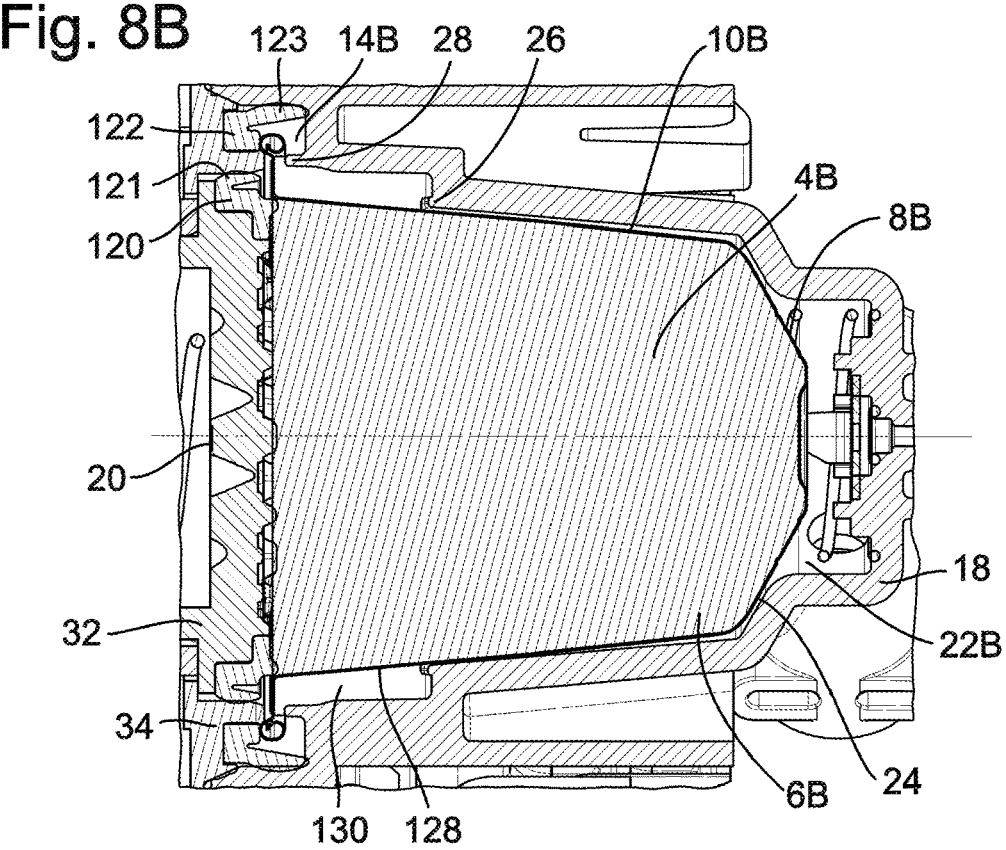

In this example the first and second capsules 4A, 4B are designed to make a similar visual impression. FIG. 8A shows an example of a first capsule 4A inserted in the brew chamber 22A formed by the first brew chamber part 18 and the second brew chamber part 20. It will be appreciated that the circumferential wall 10A is narrower than the cavity 24 at that location. As a result there is a first volume 126 surrounding the first capsule 4A inside the cavity 24. The first volume 126 is located in a first portion of the cavity 24. FIG. 8B shows an example of a second capsule 4B inserted in the brew chamber 22B formed by the first brew chamber part 18 and the second brew chamber part 20. It will be appreciated that a part 128 of the circumferential wall 10B is narrower than the cavity 24 at that location. This part 128 is formed by the part of the circumferential wall 10B extending beyond the first abutment surface 26. As a result there is a second volume 130 surrounding the second capsule 4B inside the cavity 24. The second volume 130 is located in a second portion of the cavity 24.

It is noted that the first volume 126 is not occupied by the first capsule 4A when the brew chamber holds the first capsule 4A. However, this first volume 126 is occupied by part of the second capsule 4B when the brew chamber holds the second capsule 4B. The second volume 130 is not occupied by the second capsule 4B when the brew chamber holds the second capsule 4B. This second volume 130 receiving the central portion 32 of the extraction plate 30 when the brew chamber holds the first capsule 4A. As can be seen in FIG. 8B, the cross section of the second volume 130 is larger than the diameter of first annular abutment surface 26, in fact it typically is at least as large as the diameter of first annular abutment surface 26 to enable insertion of the first capsule 4A. The second volume 130 may have walls defining an inner surface 36 (FIG. 1A) that is cylindrical, or the walls may gradually widen towards the open end of the first brew chamber part 18. The first volume 126, as may be seen in FIG. 8B, may be correspondingly shaped with respect to the second capsule 4B.

When brewing a beverage using the first capsule 4A, the first volume 126 will fill with fluid, such as water, which fluid is not used for brewing the beverage. This fluid can be drained to the waste basket after brewing. When brewing a beverage using the second capsule 4B, the second volume 130 will fill with fluid, such as water, which fluid is not used for brewing the beverage. This fluid can be drained to a container, e.g. the waste basket, after brewing. In this example the first volume 126 is substantially equal to the second volume 130. Hence, the volume of fluid directed to the waste basket is substantially equal when brewing a beverage using a first capsule 4A and when brewing a beverage using a second capsule 4B.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the central portion of the extraction plate includes a plurality of relief elements. The peripheral portion includes no relief elements. However, it will be appreciated that the peripheral portion may also include relief elements. The extraction plate and the second exit area can be adapted to each other such that a flow resistance of the second exit area when opened is less than a flow resistance of the first exit area when opened. The extraction plate and the second exit area may be adapted to each other such that the second exit area tears on the extraction plate over a larger surface area than the first exit area. The extraction plate and the second exit area may be adapted to each other such that the second exit area tears on the extraction plate on more locations than the first exit area. Outer relief elements may be designed for tearing both the first and second exit area wherein the second exit area tears on the outer relief elements over a larger surface area than the first exit area. The extraction plate can include relief elements of a first type and at least one relief element of a second type, wherein the relief elements of the first type are arranged within an area corresponding to the first exit area, and the at least one relief element of the second type being arranged within an area corresponding to the second exit area and outside the area corresponding to the first exit area. The relief element of the second type may have a sharper edge than the relief elements of the first type. The second exit area may include a weakened zone. The weakened zone may be located in a peripheral area of the second exit area.

In the examples, the first and second capsules have substantially the same shape. It is also possible to provide a third capsule having a different shape. The third capsule can e.g. be shaped to substantially fill the brew chamber when the central portion is in the first extraction position. It is also possible to provide a fourth capsule having a different shape. The fourth capsule can e.g. be shaped to substantially fill the brew chamber when the central portion is in the second extraction position.

In the examples, the first capsule has an outwardly extending flange-like rim. It will be appreciated that it is possible that the first capsule does not include an outwardly extending rim. In the examples, the second capsule has an outwardly extending flange-like rim. It will be appreciated that it is possible that the second capsule does not include an outwardly extending rim.

In the examples, the capsule body and lid are made of aluminium foil, preferable polymer coated aluminium foil to allow easy welding of the lid to the body. It will be appreciated that the capsule body and/or lid can be made of a wide variety of materials considered suitable by the skilled person and capable of being processed into a sheet, film or foil using techniques conventionally known in the art such as extrusion, co-extrusion, injection molding, blow molding, vacuum forming, etc. Suitable materials for the capsule body and/or lid include, without being limited thereto, plastic materials, in particular thermoplastic materials, for example a polyolefin polymer, for example polyethylene or polypropylene, PVC, polyesters for example polyethylene terephthalate (PET); metal foils such as aluminum, stainless steel, metal alloys etc.; or sheets of a woven or a non-woven or otherwise processed fibrous material, like paper, polyester, etc.; or combinations thereof, e.g. multilayers. The material for the capsule can be a biodegradable polymer or another biodegradable material. The skilled person will be capable of selecting the appropriate material taking into account the envisaged use with food material and any other relevant circumstances during use of the capsule. The thickness of the sheet or foil may be chosen such that a form stable capsule is provided. The thickness of the sheet or foil may vary with the nature of the material.

In the examples, the capsules are closed capsules. It is also possible to provide the system with an open capsule. The open capsule is open prior to insertion into the apparatus. The open capsule can be pre-perforated. The open capsule can be packaged in a hermetically sealed package which has to be removed before inserting the open capsule in the apparatus. In the examples, the capsules are pierced by the piercing means. It is also possible to provide the system with a capsule that is not pierced by the piercing means. Such capsule can e.g. include an entrance filter. In the examples, the capsules open against the extraction plate. It is also possible to provide the system with a capsule that does not open against the extraction plate. Such capsule can e.g. include an exit filter.

Moreover, other types of capsules may be foreseen as well. For example, a third exchangeable capsule may have a body suitably shaped such as to be receivable by the first brew chamber part. The body of the third capsule may partially fill the cavity 24 including the first volume 126. The third exchangeable capsule may for example have a substantially same length as the first capsule 4A. Thus, other than for the first and second capsules 4A, 4B the similar length to width ratio may not be followed for the third capsule. Alternatively, a fourth capsule may have a body having a substantially same shape and cross section as the second capsule 4B. However, the length of the fourth capsule may be smaller than the length of the second capsule. The body of the fourth capsule may be arranged for being manually or mechanically opened at a bottom prior to insertion into the first brew chamber part. Alternatively, the fourth capsule may reside in a sealed package when delivered to the user. An alternative fifth capsule type may have an identical shape and size as one of the first or the second capsule 4A, 4B. The fifth capsule may be arranged for opening and closing thereof for enabling refilling of a beverage ingredient therein. For example, it may comprise a refill opening, which may be closeable with a locking means or with a membrane or other layer. As a further alternative, a sixth capsule may be used in combination with a brew chamber adapter. The brew chamber adapter to be used with the sixth capsule may comprises an external shape that corresponds with an internal shape of the first brew chamber for cooperating therewith. This enables the brew chamber adapter to be inserted into the first brew chamber part. Moreover, the brew chamber adapter comprises an internal shape that corresponds with the external shape of the sixth capsule. This enables the sixth capsule to be inserted in the brew chamber adapter and thereby into the first brew chamber part. The advantage thereof is that the adapter allows to insert the sixth capsule which has a different shape than any of the other capsules. Moreover, as a further alternative, a seventh exchangeable capsule may have a body that is suitably shaped such as to be receivable by the first brew chamber part. The seventh capsule includes an open section for enabling refilling of a beverage ingredient therein. Hence, this seventh exchangeable capsule is already open and may be filled with any desired kind of roast. As an even further alternative, an eighth exchangeable capsule may have a cup-shaped body wherein an upper end part of the body is shaped such as to at least partially fill the second volume. This reduces or maybe even completely fills the second volume to reduce the amount of waste water. Moreover, an even further embodiment includes a ninth exchangeable capsule having a cup-shaped body wherein an upper end part of the body is shaped such as to at least partially correspond to the cavity, such as to at least partially fill the second volume. Like the eighth capsule, also the ninth capsule reduces the amount of waste water produced. Like the alternative flowerpot-type capsules described herein, also the eighth and the ninth exchangeable capsules may be shaped such as to have the appearance of a flowerpot.

In addition, in accordance with yet further embodiments, the system of the present invention may be used in combination with a first capsule complementary brew chamber adapter suitably shaped such as to fill or close the first volume when the brew chamber holds the first exchangeable capsule. Moreover, the system may also be used in combination with a second capsule complementary brew chamber adapter suitably shaped such as to fill or close the second volume when the brew chamber holds the second exchangeable capsule. The advantages of the abovementioned first capsule brew chamber adapter and second capsule brew chamber adapter is that these adapters enable to further reduce the amount of waste water produced during brewing.

In the examples, the capsules themselves do not include a sealing member. It will be appreciated that it is possible to provide the capsule with a sealing member, e.g. a resilient sealing member. The sealing member can e.g. be placed on the rim, e.g. on the side facing towards the cup-shaped body or on the side facing away from the cup-shaped body. Alternatively, or additionally, a sealing member can be provided on the circumferential wall and/or on the bottom.

In the examples the arresting ring and retainer extend along substantially the entire perimeter of the first and second brew chamber parts. This provides particular good locking of the two brew chamber parts onto each other. However, it will be appreciated that it is also possible that the arresting ring and retainer include arresting means and retaining means at one or more discrete positions along the perimeter, e.g. at two, three, four, six or eight positions.

The first and second brew chamber parts may provide for a cavity that corresponds with any of the capsule types proposed. For example, the cavity may be frusto-conical, frusto-pyramid, cylindrical, cubical, block shaped, stepwise cylindrical, stepwise frusto-conical, stepwise frusto-pyramid, stepwise cubical, stepwise block shaped, bullet shaped, or truncated bullet shaped.

It will be appreciated that it is also possible to provide a first apparatus arranged for brewing a beverage using a first capsule, but incapable of brewing a beverage using a second capsule. Such first apparatus can be included in a system with the apparatus as described in relation to the figures and a first capsule and optionally a second capsule.

It will be appreciated that it is also possible to provide a second apparatus arranged for brewing a beverage using a second capsule, but incapable of brewing a beverage using a first capsule. Such second apparatus can be included in a system with the apparatus as described in relation to the figures and a second capsule and optionally a first capsule.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A system for preparing a predetermined quantity of beverage suitable for consumption, including:
   an apparatus including a first brew chamber part and a second brew chamber part forming a brew chamber for selectively holding one of a first exchangeable capsule and a second exchangeable capsule and
   a fluid dispensing device for supplying an amount of fluid, such as water, under pressure to the first brew chamber part, the first brew chamber part having a cavity for selectively holding one of the first and second exchangeable capsules, and wherein the first brew chamber part includes a first annular volume not occupied by the first exchangeable capsule and surrounding the first exchangeable capsule when the brew chamber holds the first exchangeable capsule, which first volume is arranged for holding part of the second exchangeable capsule when the brew chamber holds the second capsule, wherein the first brew chamber part includes a second annular volume not occupied by the second exchangeable capsule and surrounding the second exchangeable capsule when the brew chamber holds the second capsule, which second volume is arranged for receiving the second brew chamber part when the brew chamber holds the first capsule.

2. The system according to claim 1, wherein the first and second capsules have substantially the same length to diameter ratio.

3. The system according to claim 1, wherein the second brew chamber part is movable into a first or second position, wherein in the first position the first and second brew chamber parts form the brew chamber for holding the first capsule, and in the second position the first and second brew chamber parts form the brew chamber for holding the second capsule.

4. The system according to claim 1, wherein the apparatus includes a sealing member for sealing the first and the second brew chamber part when holding the second capsule.

5. The system according to claim 4, wherein the second capsule has a sealing surface for sealing against the sealing member, wherein the sealing surface has an inner diameter that is larger than an outer diameter of a body of the first capsule.

6. The system according to claim 4, wherein the second capsule has a flange-like rim arranged for providing a fluid sealing engagement with the second sealing member.

7. The system according to claim 1, wherein the apparatus includes a further sealing member for sealing the first and second brew chamber part when holding the first capsule, wherein the first capsule has a first flange-like rim arranged for providing a fluid sealing engagement with the first sealing member.

8. The system according to claim 1, wherein the first brew chamber part comprises a first annular abutment surface located in the cavity for cooperating with the first capsule.

9. The system according to claim 8, wherein the cavity includes a bottom section and one or more peripheral walls, and wherein the first annular abutment surface is located in at least one of the peripheral walls at a distance of at least a length of the first capsule from the bottom section.

10. The system according to claim 8, wherein the cavity comprises a portion defining the second volume, the portion having a cross section larger than or equal to a diameter of the first annular abutment surface.

11. The system according to claim 8, wherein at least a part of the second portion is shaped corresponding with the second capsule for following a shape of the body where the cross section of the body is larger than or equal to the diameter of the first annular abutment surface, for minimizing the second volume.

12. The system according to claim 1, wherein the first brew chamber part comprises a second annular abutment surface for cooperating with the second capsule.

13. The system according to claim 1, wherein the cavity comprises a further portion defining the first volume, said further portion having a shape and size corresponding with the second capsule for receiving the second capsule therein.

14. The system according to claim 1, wherein the first and the second capsule each comprise a cup-shaped body having slanted circumferential walls providing a gradually decreasing cross section in a direction towards a bottom of the body, wherein the slanted circumferential walls of the first and the second capsule are slanted at substantially the same angle relative to an axial direction of the capsules.

15. The system according to claim 1, the first capsule including a first flange-like rim, and the second capsule comprising a second flange-like rim, wherein a ratio between the length of the body and a diameter of the first flange-like rim is substantially the same as a ratio between the length of the body and a diameter of the second flange-like rim.

16. The system according to claim 1, further including the first and/or second exchangeable capsule.

17. The system according to claim 1, further including at least one element of a group comprising:

a third exchangeable capsule having a body suitably shaped such as to be receivable by the first brew chamber part, and such as to partially fill the cavity including the further volume, the third exchangeable capsule having a substantially same length as the first capsule;

a fourth exchangeable capsule including a body having a substantially same shape and cross section as the second capsule but having a length smaller than the length of the second capsule, the body of the fourth capsule optionally being arranged for being manually or mechanically opened at a bottom prior to insertion into the first brew chamber part;

a fifth exchangeable capsule having an identical shape and size as one of the first or the second capsule, the fifth capsule being arranged for opening and closing thereof for enabling refilling of a beverage ingredient therein;

a sixth exchangeable capsule in combination with a brew chamber adapter, wherein the brew chamber adapter comprises an external shape that corresponds with an internal shape of the first brew chamber for cooperating therewith, and wherein the brew chamber adapter comprises an internal shape that corresponds with an external shape of the sixth capsule, for enabling the sixth capsule to be inserted in the first brew chamber part;

a seventh exchangeable capsule having a body suitably shaped such as to be receivable by the first brew chamber part, the seventh capsule including an open section for enabling refilling of a beverage ingredient therein;

an eighth exchangeable capsule having a cup-shaped body wherein an upper end part of the body is shaped such as to at least partially fill the second volume;

a ninth exchangeable capsule having a cup-shaped body wherein an upper end part of the body is shaped such as to at least partially correspond to the cavity, such as to at least partially fill the second volume;

a first capsule complementary brew chamber adapter suitably shaped such as to fill or close the further volume when the brew chamber holds the first exchangeable capsule; or a second capsule complementary brew chamber adapter suitably shaped such as to fill or close the volume when the brew chamber holds the second exchangeable capsule.

18. A set of capsules for use in a system according to claim 1, the set including a first exchangeable capsule and a second exchangeable capsule, wherein the second capsule is larger than the first capsule, wherein each one of the first and second capsules has a shape and size such as to be receivable in a cavity of a first brew chamber part, and such that the cavity is closeable by a second brew chamber part cooperating with the first brew chamber part for forming a brew chamber, the first and second brew chamber part being comprised by an apparatus arranged for preparing a predetermined quantity of beverage suitable for consumption by selectively using one of the first or second capsule, wherein the first capsule is shaped such as to define a first annular volume within the cavity between a body of the first capsule and a peripheral wall of the first brew chamber part and surrounding the first exchangeable capsule, when the first capsule resides in the cavity, which first volume is arranged for holding part of the second capsule when the brew chamber holds the second capsule instead of the first capsule, and wherein the second capsule is shaped such as to define a second annular volume within the cavity between a body of the second capsule and a peripheral wall of the first brew chamber part and surrounding the second exchangeable capsule, when the second capsule resides in the cavity, which second volume is arranged for receiving the second brew chamber part when the brew chamber holds the first capsule instead of the second capsule.

19. A brew chamber assembly comprising a first brew chamber part and a second brew chamber part arranged for cooperating with each other for forming a brew chamber for selectively holding one of a first exchangeable capsule and a second exchangeable capsule, wherein the second exchangeable capsule is larger than the first exchangeable capsule, wherein the assembly is arranged for cooperating with a fluid dispensing device for supplying an amount of fluid, such as water, under pressure to the first brew chamber part, the first brew chamber part having a cavity for selectively holding one of the first and second exchangeable capsules, wherein the first brew chamber part is shaped such as to include a first annular volume not occupied by the first exchangeable capsule and surrounding the first exchangeable capsule when the brew chamber holds the first exchangeable capsule, which first volume is arranged for holding part of the second exchangeable capsule when the brew chamber holds the second capsule, and wherein the first brew chamber part is further shaped such as to include a second annular volume not occupied by the second exchangeable capsule and surrounding the second exchangeable capsule when the brew chamber holds the second capsule, which second volume is arranged for receiving the second brew chamber part when the brew chamber holds the first capsule.

* * * * *